(12) United States Patent
Lee

(10) Patent No.: US 10,728,752 B2
(45) Date of Patent: Jul. 28, 2020

(54) CASE FOR A PORTABLE DEVICE

(71) Applicant: CONFIVOX INC., Toronto (CA)

(72) Inventor: John David Lee, Toronto (CA)

(73) Assignee: CONFIVOX INC., Toronto (CA)

( * ) Notice: Subject to any disclaimer, the term of this patent is extended or adjusted under 35 U.S.C. 154(b) by 181 days.

(21) Appl. No.: 15/953,401

(22) Filed: Apr. 13, 2018

(65) Prior Publication Data

US 2018/0234842 A1    Aug. 16, 2018

Related U.S. Application Data

(63) Continuation-in-part of application No. 15/893,690, filed on Feb. 11, 2018, now abandoned, which is a continuation of application No. 15/285,812, filed on Oct. 5, 2016, now abandoned.

(60) Provisional application No. 62/304,550, filed on Mar. 7, 2016, provisional application No. 62/240,840, filed on Oct. 13, 2015.

(51) Int. Cl.
| | | |
|---|---|---|
| *H04W 12/02* | (2009.01) | |
| *H04M 1/02* | (2006.01) | |
| *H04M 1/18* | (2006.01) | |
| *H04M 1/04* | (2006.01) | |

(52) U.S. Cl.
CPC .......... *H04W 12/02* (2013.01); *H04M 1/026* (2013.01); *H04M 1/185* (2013.01); *H04M 1/04* (2013.01)

(58) Field of Classification Search
CPC ........ A61B 2034/305; A61B 2090/508; A61B 34/30; A61B 34/70; A61B 90/50; B25J 13/00; B25J 17/00; B25J 19/0004; B25J 9/161; B25J 9/1674; F16C 11/10; F16C 11/103; F16D 2121/22; F16D 49/08; F16D 49/16; F16D 65/16; F16M 11/08; F16M 13/02; F16M 2200/022; F16M 2200/024; F16M 2200/06; Y10S 901/09; Y10S 901/20
See application file for complete search history.

(56) References Cited

U.S. PATENT DOCUMENTS

| | | |
|---|---|---|
| 4,537,276 A | 8/1985 | Confer |
| 5,778,062 A | 7/1998 | Vanmoor |
| 5,818,924 A | 10/1998 | King et al. |
| 5,848,152 A | 12/1998 | Slipy et al. |
| 5,881,150 A | 3/1999 | Persson |
| 6,075,977 A | 6/2000 | Bayrami |
| 6,185,529 B1 | 2/2001 | Chen et al. |
| 6,510,311 B1 | 1/2003 | Stitt |
| 7,515,708 B1 | 4/2009 | Doty, III et al. |
| 7,747,008 B2 | 6/2010 | Snodgrass |

(Continued)

FOREIGN PATENT DOCUMENTS

| | | |
|---|---|---|
| EP | 1536269 A1 | 6/2005 |
| GB | 2439765 A | 1/2008 |

OTHER PUBLICATIONS

Pham, Timothy X, , Non-Final Office Action, Issued in U.S. Appl. No. 15/893,690, dated Apr. 18, 2018, 15 pages.

(Continued)

*Primary Examiner* — Timothy X Pham
(74) *Attorney, Agent, or Firm* — Bereskin & Parr LLP/S.E.N.C.R.L., s.r.l.

(57) ABSTRACT

A case for use with a portable device such as mobile phone or tablet computer, to facilitate protecting, carrying, or using the portable device.

17 Claims, 16 Drawing Sheets

(56) References Cited

U.S. PATENT DOCUMENTS

| | | |
|---|---|---|
| 8,560,031 B2 | 10/2013 | Barnett et al. |
| 8,996,382 B2 | 3/2015 | McClung, III |
| 9,049,283 B1 | 6/2015 | Kim |
| 9,097,382 B1 | 8/2015 | Leech et al. |
| 9,124,792 B2 | 9/2015 | Barangan et al. |
| D782,488 S | 3/2017 | Kim |
| 9,590,683 B2 | 3/2017 | Greiner |
| 9,596,332 B2 | 3/2017 | Gander et al. |
| 9,806,756 B1 | 10/2017 | Jacobs et al. |
| 2002/0077838 A1 | 6/2002 | Dutta |
| 2002/0180694 A1* | 12/2002 | Isaacson ............... G06F 1/1626 345/156 |
| 2004/0259602 A1 | 12/2004 | Zack |
| 2005/0241972 A1* | 11/2005 | Hassett .................... A45C 5/06 206/320 |
| 2006/0215835 A1 | 9/2006 | Snodgrass |
| 2007/0127659 A1 | 6/2007 | McClory et al. |
| 2009/0202064 A1 | 8/2009 | Snodgrass |
| 2013/0280463 A1 | 10/2013 | On et al. |
| 2013/0300985 A1 | 11/2013 | Bulda |
| 2014/0051480 A1 | 2/2014 | Cruz |
| 2014/0361130 A1 | 12/2014 | Fenton |
| 2015/0249478 A1* | 9/2015 | Greiner ................. H04B 1/3888 455/575.8 |
| 2015/0381785 A1 | 12/2015 | Gander et al. |
| 2016/0088752 A1 | 3/2016 | Zaccaria |
| 2016/0227663 A1 | 8/2016 | Holmes |
| 2016/0323002 A1* | 11/2016 | Cho ..................... H04B 1/3888 |
| 2017/0105118 A1 | 4/2017 | Lee |

OTHER PUBLICATIONS

Pham, Timothy X, Non-Final Office Action, Issued in U.S. Appl. No. 15/285,812, dated Aug. 10, 2017, 15 pages.

Nighfly. "Cell Phone Stand, 2Pack Cellphone Holder for Desk Lightweight Portable Foldable Tablet Stands Desktop Dock Cradle for iPhone Android Smartphone iPad Office Supplies Pop Accessories Gray Silver," Date First Available: Mar. 18, 2019. URL https://www.amazon.ca/Cellphone-Lightweight-Portable-Smartphone-accessories/dp/B07P8CK47X/ref=sr_1_3?keywords=kokobi&qid=1583852692&sr=8-3.%20Date%20first%20available%20-%20March%202018,%202019. 3 pages.

UGREEN, "UGREEN Phone Stand Multi-Angle Cell Phone Stand Desk Stand Holder Tablet Stand Compatible for iPhone XS Max, XR, X, 8 7 6 Plus, Samsung Galaxy S10 S9 S8 S7 S6 Plus, Note 9 8, LG G7, OnePlus 5T, Xiaomi Mi A2 Lite, Mi 8 Lite (Small, Black)" Date first available: Apr. 19, 2019. URL https://www.amazon.ca/UGREEN-Multi-Angle-Compatible-Samsung-Tablets/dp/B07BK5P5ST/ref=sr_1_19?keywords=ugreen&qid=1583853159&sr=8-19.%20Date%20first%20available%20-%20April%2019,%202019. 3 pages.

Lamicall, "Lamicall S1 Cell Phone Stand for iPhone X 8 7 Plus 6s other Smartphones—Silver," Date first available: Jun. 1, 2016. URL https://www.amazon.ca/Lamicall-Phone-Stand-iPhone-Smartphones/dp/B014INJCT4/ref=sr_1_2?keywords=lamicall&qid=1583853184&sr=8-2.%20Date%20first%20available%20-%20June%201,%202016. 3 pages.

\* cited by examiner

CASE FOR A PORTABLE DEVICE

CROSS-REFERENCE TO RELATED APPLICATIONS

This application is a continuation-in-part of application Ser. No. 15/893,690, filed on Feb. 11, 2018, which is a continuation of application Ser. No. 15/285,812, filed on Oct. 5, 2016, which claims the benefit of U.S. provisional application Ser. No. 62/304,550, filed on Mar. 7, 2016, and claims the benefit of U.S. provisional application No. 62/240,840, filed on Oct. 13, 2015. The contents of all of these applications are expressly incorporated by reference herein.

BACKGROUND

Technical Field

This disclosure relates generally to the field of an apparatus for use with a portable device such as mobile phone or tablet computer, to facilitate protecting, carrying, or using the portable device.

Background Art

Description

Portable electronic devices such as mobile phones and tablet computers are ubiquitous. According to one source, there are 2.5 billion smartphone users and 1.2 billion tablet users worldwide.

Many people purchase cases for portable devices to protect the portable devices from damage, if and when they are dropped or otherwise subject to external shocks.

Some people purchase stands for portable devices to prop them up in orientations to facilitate viewing videos or otherwise operating the device.

SUMMARY

A case for use with a portable device such as mobile phone or tablet computer, to facilitate protecting, carrying, or using the portable device.

DETAILED DESCRIPTION

Figure 1:
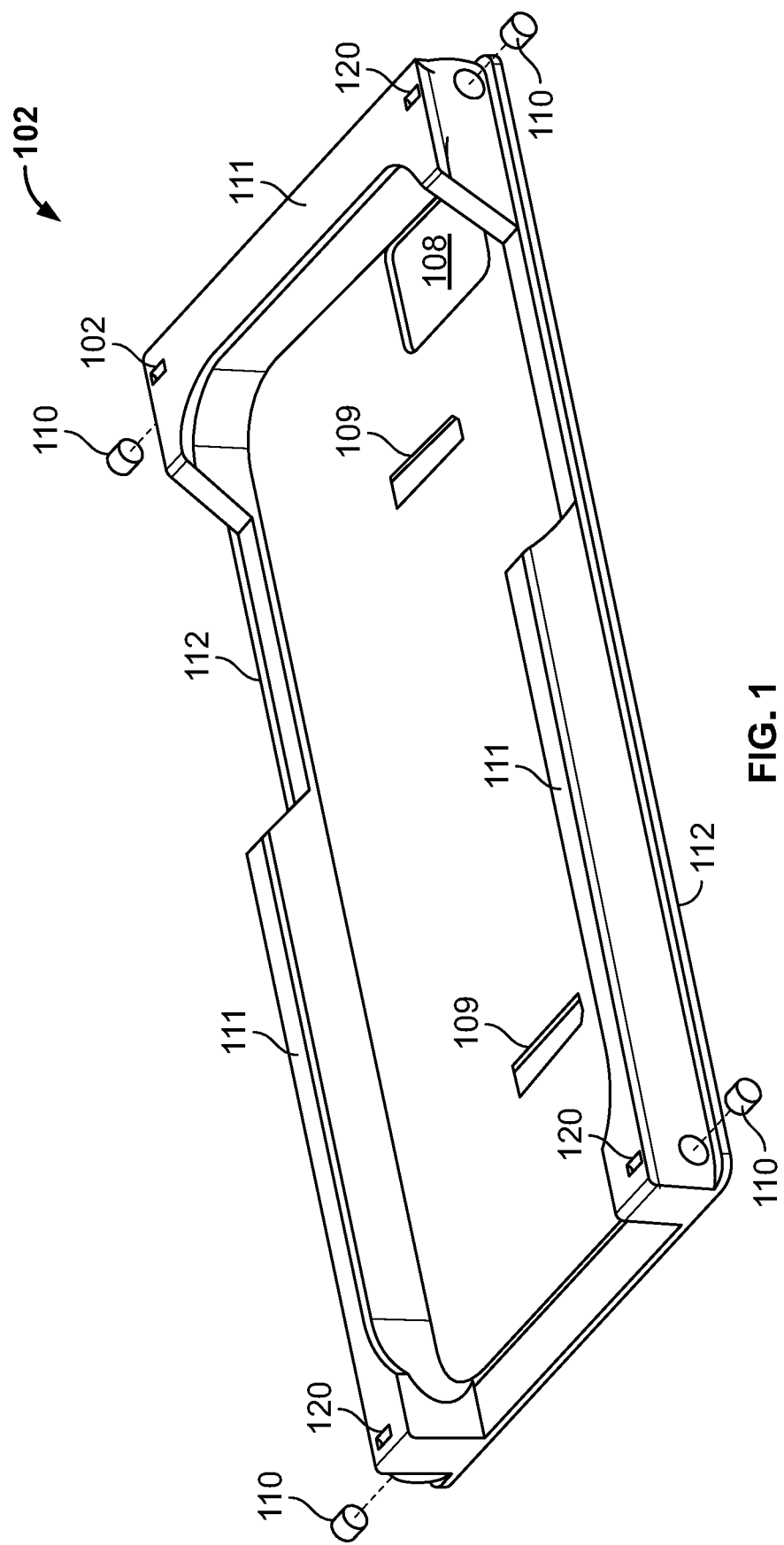
FIG. 1 illustrates an exploded view of one embodiment of an inner member.

Various examples of embodiments will be described below with reference to the drawings. The following exemplary embodiments are illustrative and are not to be construed as limiting.

As used herein, any usage of terms that suggest an absolute orientation (e.g. "top", "bottom", "front", "back", etc.) are for illustrative convenience and typically refer to either the orientation defined by a portable device to be contained within the apparatus, or the orientation as shown in a particular figure. However, such terms are not to be construed in a limiting sense as it is contemplated that various components will, in practice, be utilized in orientations that are the same as, or different than, those described or shown.

An apparatus for use with a portable device is disclosed. In preferred embodiments, the apparatus is a case for a mobile phone or tablet device. In other embodiments, the apparatus is configured for use with portable devices other than mobile phones or tablets.

Some portable devices have a display. A user may configure the case according to a configuration as described herein to view the display.

Some portable devices have a keyboard, or a touch-sensitive display configurable as an electronic keyboard. A user may configure the case according one configuration as described herein to use the keyboard.

In some embodiments, the case may be used as a stand to hold the portable device in various portrait or landscape orientations on various surfaces such as a desk or table, or more unusual surfaces such as on a blanket, leg, or backpack.

The case includes an inner member 102 and an outer member 103. The outer member includes a base member pivotally coupled to an extension member.

In a preferred embodiment, the inner member 102 retains a portable device within a cavity and is configured to slide within the outer member 103 through an opening at the periphery of the base member or the extension member.

When the base member and the 104 and the outer member 105 receive the inner member 102, it is through outer member tracks 115 which mate with and guide the inner member's rails 112.

FIG. 1 shows one embodiment of an inner member 102.

The inner member 102 has a cavity configured to receive a portable device (not shown) and one or more lips 111 surrounding the cavity that retains the portable device within the inner member 102. The lips 111 extend up from the back of the inner member and over a portable device 101 (not shown).

The lips 111 surround an opening in the inner member 102 configured to expose a display and/or keyboard on the portable device 101.

In preferred embodiments, the inner member 102 has rails 112 extending laterally outward for slideably engaging with opposing tracks 115 (not shown) on the lateral sides of the interior surface of the outer member 103 (described herein).

The inner member 102 has an camera opening 108 positioned to allow for a rear camera on the portable device 101 to capture images through the camera opening 108 while the portable device is contained within the inner member 102 in one or more of the exemplary configurations described herein.

Gaps between the lips 111 on the periphery of the inner member 102, and other openings on the inner member 102, may be positioned to allow for operation of various features of the portable device 101 while it is contained in the case in one or more of the configurations described herein. These features include but are not limited to buttons 113, ports 114 for data and power, microphones, speakers, ambient light sensors and fingerprint sensors.

Case magnets 110 are positioned near four corners of the inner member 102. These case magnets 110 are positioned to magnetically couple with case magnets 110 arranged on the interior surface of the outer member 103 as the inner member 102 slides along the tracks 106 at one or more positions within the outer member 103 as described herein. The case magnets 110 of the inner member 102 are oriented to have a polarity that attracts the case magnets 110 of the outer member 103 as they approach each other.

The magnetic attraction causes some "stickiness" at the positions where one or more case magnets 110 are adjacent to each other. This stickiness does not prevent a user from moving the inner member 102 past those positions within the outer member 103, but may tend to hold the inner member 102 in the position as described herein. The force is dependent on the strength of the selected case magnets 110.

In some embodiments, the case magnets 110 are secured within the inner member 102 using glue. In other embodiments, the shape of the case magnets 110 have one or more lateral protrusions such that when it is inserted into the inner member 102 the protrusions snap into a receptacle within inner member 102 that secures the case magnet 110 in place. In other embodiments, the case magnets 110 are secured using a spring or clip.

Magnet indicators 120 are marks on the top of the lips 111 at points along the rails 112 that provide a visual indicator as to where the case magnet 110 is located. This makes it easier for a user to align the case magnets 110 of the inner member 102 and the outer member 103 when sliding the inner member 102 on the tracks 115.

The inner member 102 has a pair of base connectors 109. In some embodiments, the base connectors 109 are openings within the inner member 102 shaped to receive hinge protrusions from the extension member 103 as described herein.

The lips are generally configured to secure the portable device within the inner member 102. In some embodiments, the lip is made of flexibly resilient materials to snap over an edge of the portable device to retain it within the inner member 102. In some embodiments, the portable device 101 is removed from the inner member 102 by peeling back the sides of the inner member 102 with fingers or a tool.

In other embodiment, the lips can be substituted with a clip or hooking mechanism. The lip can also be omitted in other embodiments where the portable device can be secured using a friction fit.

Figure 2:
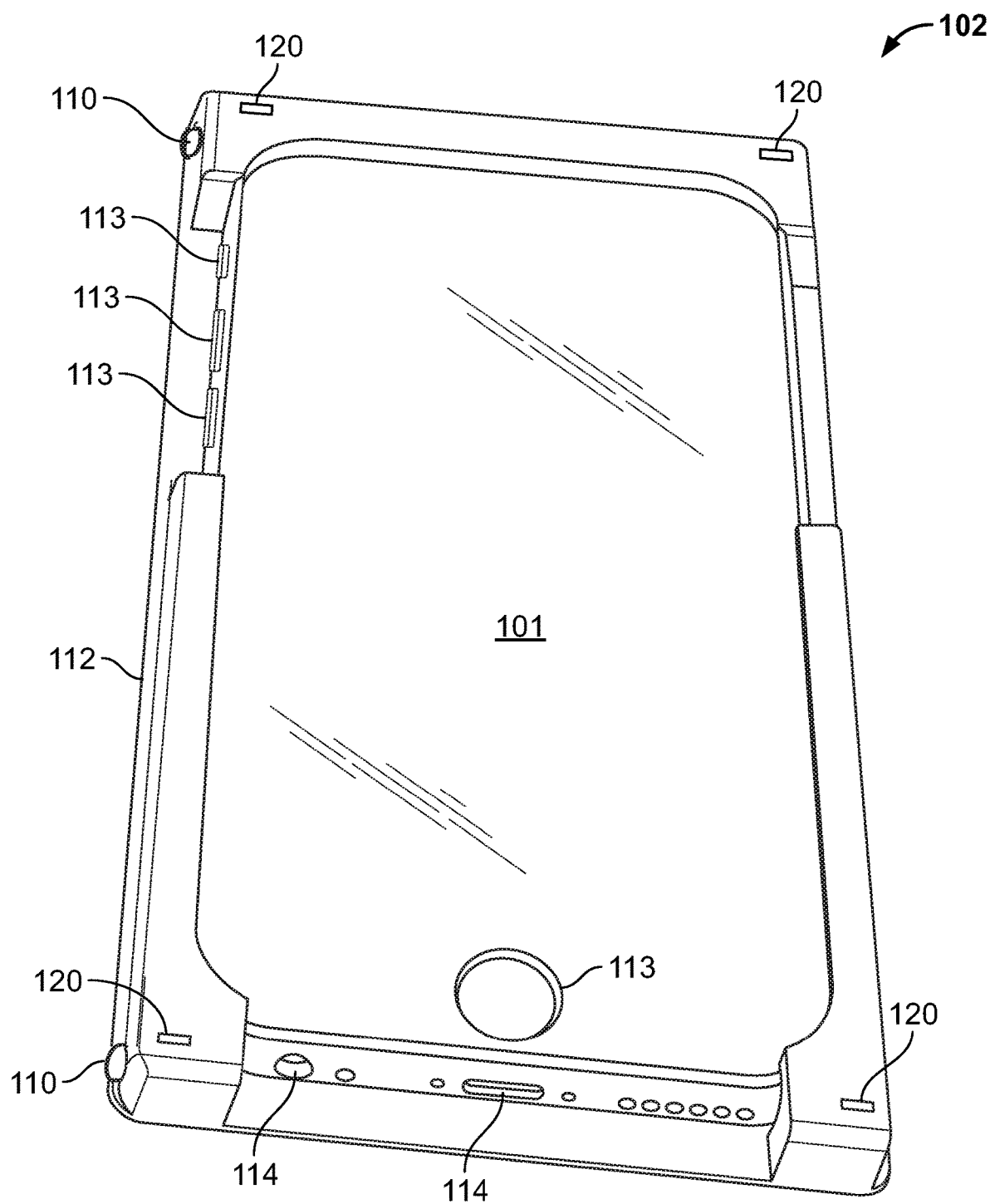
FIG. 2 illustrates one embodiment of an inner member containing a portable electronic device.

FIG. 2 illustrates an inner member 102 containing a portable device 101 having buttons 113 and ports 114 made accessible through gaps and openings in the inner member 102. In some embodiments, the positions of the gaps and openings are designed to accommodate the features of one or more particular models of portable devices.

Case magnets 110 are positioned within the inner member 102 on the periphery near each of the four corners of the inner member 102.

In preferred embodiments, the inner member 102 has rails 112 extending laterally outward for slideably engaging with opposing tracks 115 (not shown) on the lateral sides of the interior surface of the outer member 103 (described herein).

Figure 3:
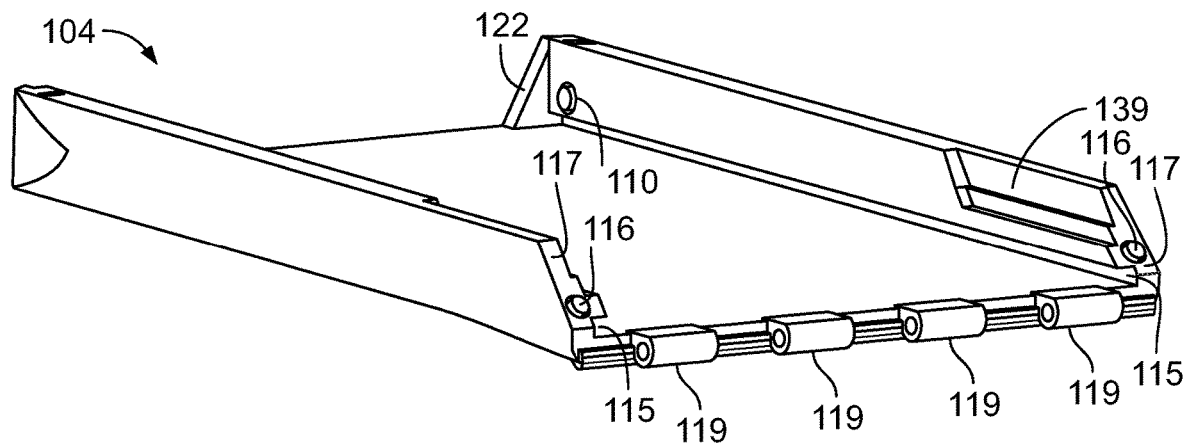
FIG. 3 illustrates one embodiment of an base member, the inner cavity being face up in the illustration.

FIG. 3 illustrates one embodiment of the base member 104.

The outer member 103 includes a base member 104 and an extension member 105 coupled so that the rails 112 of the base member 104 and the rails 112 of the extension member 105 can be substantially aligned with each other in one configuration and at substantially right angles to each other in a second configuration.

In a preferred embodiment, the base member and extension member are coupled to each other using a hinge rotating around an axis that is substantially perpendicular to the axis along the length of the tracks on lateral sides of outer member 103.

The base member 104 includes tracks 115 along opposing interior lateral sides of the base member 104. Each track 115 is positioned to receive a rail 112 from the inner member 102 so that the inner member 102 is slideable along the track 115 within the base member 104.

At one end of each of the lateral sides of the outer member are bumpers 122 that are positioned to stop the inner member 102 from sliding in the direction of the bumper 122 when the edge of the inner member runs up against the bumper 122.

At the other end of the lateral sides of the outer member are knuckles 119. The knuckles 119 of the base member 104 are laterally spaced apart to allow for knuckles 119 of the extension member 105 and the knuckles 119 of the base member 104 to be interleaved. A hinge pin 137 is inserted through the core of the interleaved knuckles 119 to form a hinge. The core of the interleaved knuckles can be sealed with a cover to prevent the hinge pin 137 from sliding out.

Hinge stops 117 of the base member 104 are positioned to butt up against corresponding hinge stops 117 on the extension member 105 when the extension member 105 is at an angular position with respect to the base member 104. This first angular position associated with the hinge stops is used for configurations as described below.

Hinge magnets 116 are positioned within each hinge stop 117. In some embodiments, the hinge magnets 116 are secured within the hinge stop 117 using glue. In other embodiments, the shape of the hinge magnets 116 have one or more lateral protrusions such that when it is inserted into the hinge stop 117, the protrusions snap into a receptacle that retains the hinge magnet 116.

The hinge magnets 116 of the extension member 105 are oriented to have a polarity that attracts the corresponding hinge magnets 116 of the base member 104 as the hinge magnets butt up against each other. In a preferred embodiment, the hinge magnets 116 are stronger than the case magnets 110.

Figure 4:
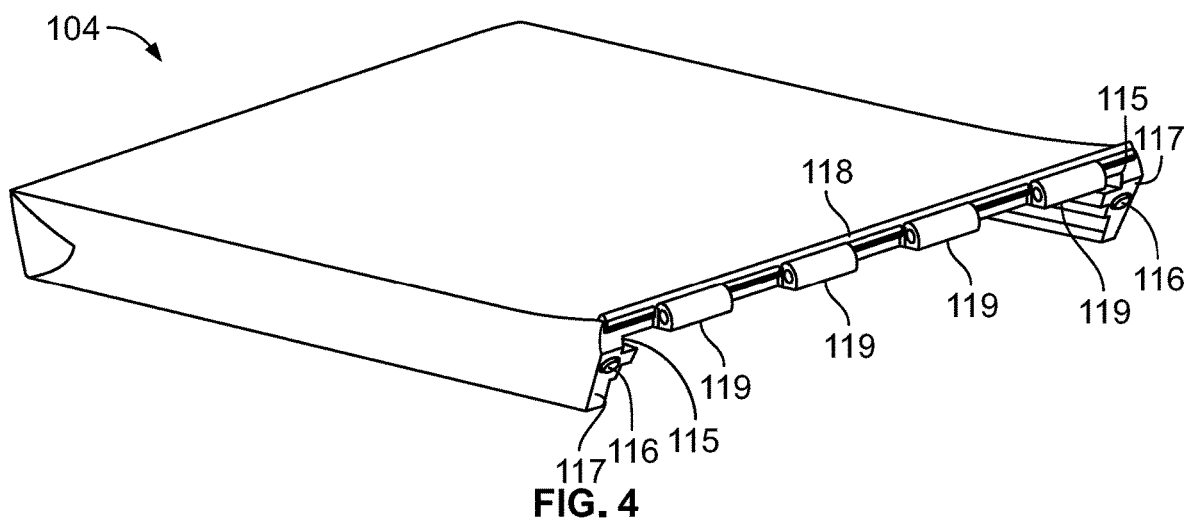
FIG. 4 illustrates one embodiment of a base member, the inner cavity being face down in the illustration.

FIG. 4 shows a perspective view of the back side of one embodiment of the base member 104. This perspective view shows the knuckles 119, the hinge stops 117 and the hinge magnets 116.

A hinge stops 118 limit the angular motion of the hinge in the opposite angular direction as the hinge stops 117. In the illustrated embodiment, the hinge stop 118 is a long narrow protrusion across the width of the hinge. The operation of the hinge stop 118 is described below. This second angular position associated with the hinge stops is used for configurations as described below.

A ledge 139 is positioned at lateral sides adjacent to each of the two hinge stops 117. The ledge 139 opens up the area around the gaps in between the lips 111 in the inner member 102 when the inner member 102 is fully inserted into the outer member 103. This allows for easier access for fingers to reach buttons 113 on the side of the portable device 101.

The ledge 139 also acts as a hinge stop in certain configurations. This third angular position associated with the hinge stops is used for configurations as described below.

Figure 5:
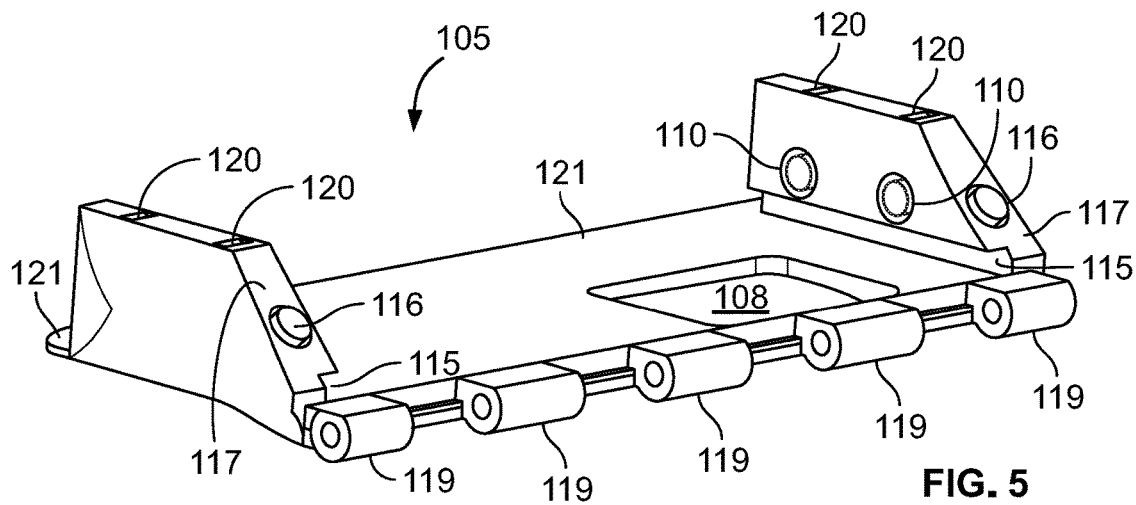
FIG. 5 illustrates one embodiment of an extension member, the inner cavity being face up in the illustration.

FIG. 5 shows a perspective view of one embodiment of the extension member 105.

The extension member 105 has knuckles 119 positioned to interleave with the knuckles 119 of the base member 104.

In some embodiments, the extension member 105 is at substantially 90 degree angle relative to the base member 104 at the first angular stop position.

In a preferred embodiment, adjacent to the hinge on lateral sides of the base member and adjacent to the hinge on lateral sides of the extension member are pairs of hinge stops 117 each containing a magnet. When the extension member 105 is at a substantially right angle to the base member 104, the corresponding magnets of the base member 104 and the extension member 105 on lateral sides of the outer member 103 are magnetically coupled to each other to hold the extension member 105 at a substantially right angle relative to the base member 104. The strength of the selected hinge magnets 116 are a matter of design choice depending on factors such as the weight of the portable device 101 and the separation forces expected in the ordinary use of the device as described herein. Separation forces are forces that tend to separate the hinge magnets 116 during normal operation in various configurations. These separation forces might be the result of shocks and impacts on the case containing the portable device.

In a preferred embodiment, the extension member 105 has a length (measured parallel to the track) about one-fifth the length of the base member 104. This relationship is a matter of design choice to be optimized for the size and weight of the portable device 101, and the range of configurations to be used with that portable device 101.

A camera opening 108 is positioned to allow for a rear camera on the portable device 101 to capture images through the camera opening 108 while the portable device is contained within the inner member 102 in one or more of the exemplary configurations described herein.

The dimensions of the inner cavity of the inner member 102, and the size and position of various openings of the inner member 102 may be customized for particular brands and models of mobile phone and tablet devices. In some embodiments, several versions of inner members 102 are developed each having an inner cavity that is designed to accommodate more than one brand and/or models of portable devices, while the outer dimensions are compatible with an outer member 103 that is configured to work with several of the various versions of the inner members. This may reduce the number of stock keeping units required to support broad compatibility with many portable devices.

A rail guide 121 extends past the end of the tracks 115 opposite the hinge on the extension member 105 to help guide the inner member into the tracks 115. The rail guide 121 is at one of the openings used to receive the inner member 102 into the extension member 105.

Figure 6:
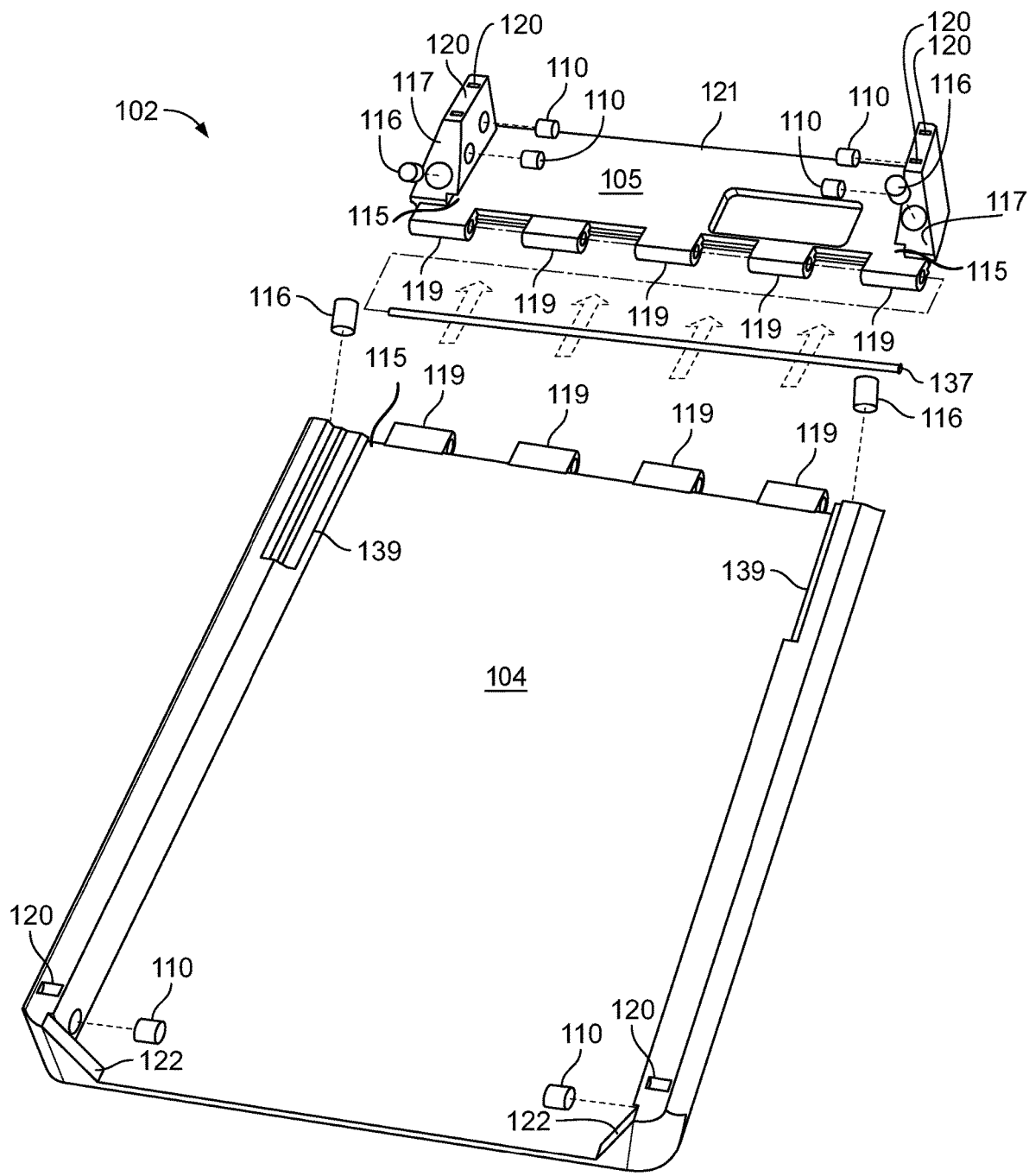
FIG. 6 illustrates an exploded view of one embodiment of an outer member, the inner cavity being face up in the illustration.

FIG. 6 shows one embodiment of an exploded view of the outer member 103 including a base member 104 and an extension member 105 pivotally coupled to each other by a hinge. The hinge includes knuckles 119 integrated into the base member 104 and the extension member 105, and a hinge pin inserted into the core of the interleaved knuckles 119.

The base member and extension member includes case magnets 110 positioned along the tracks 115 magnet indicators 120, and hinge magnets 116, knuckles 119 and a hinge pin 137.

Figure 7:
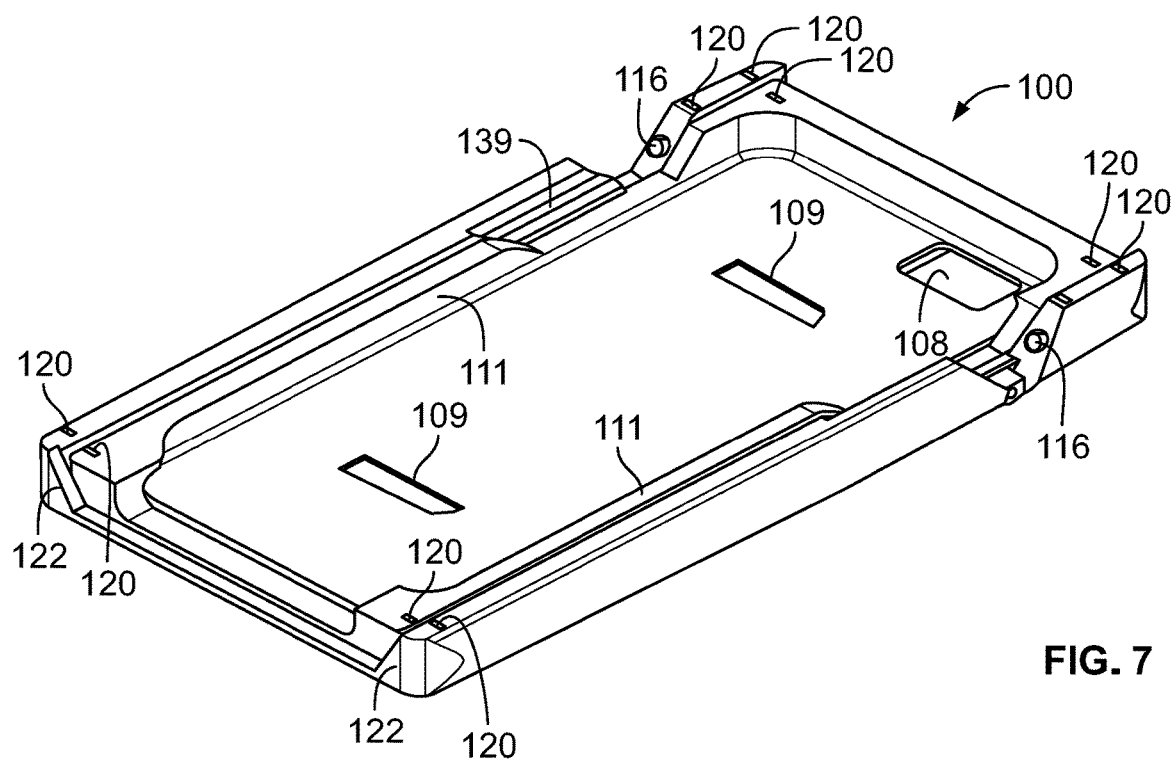
FIG. 7 illustrates one embodiment of a case comprising an outer member and an inner member.

FIG. 7 shows one embodiment of the case where the inner member 102 is contained within the outer member 103.

The base member 104 and the extension member 105 are substantially aligned so that rails of the inner member 102 can slide through the tracks 115 of the extension member 105 and the base member 104. In this embodiment, the angular position of the extension member 105 is approximately 180 degrees relative to the base member 104.

In a preferred embodiment, the inner member 102 is received onto the rail guide 121 and slides through the extension member 105 guided by the tracks 115 past the hinge and onto the tracks 115 of the base member 104. In a preferred embodiment, the inner member 102 fits within the outer member 103 when the inner member 102 slides along the tracks 115 of the extension member 105 and the base member 104 to the bumpers 122.

Figure 8:
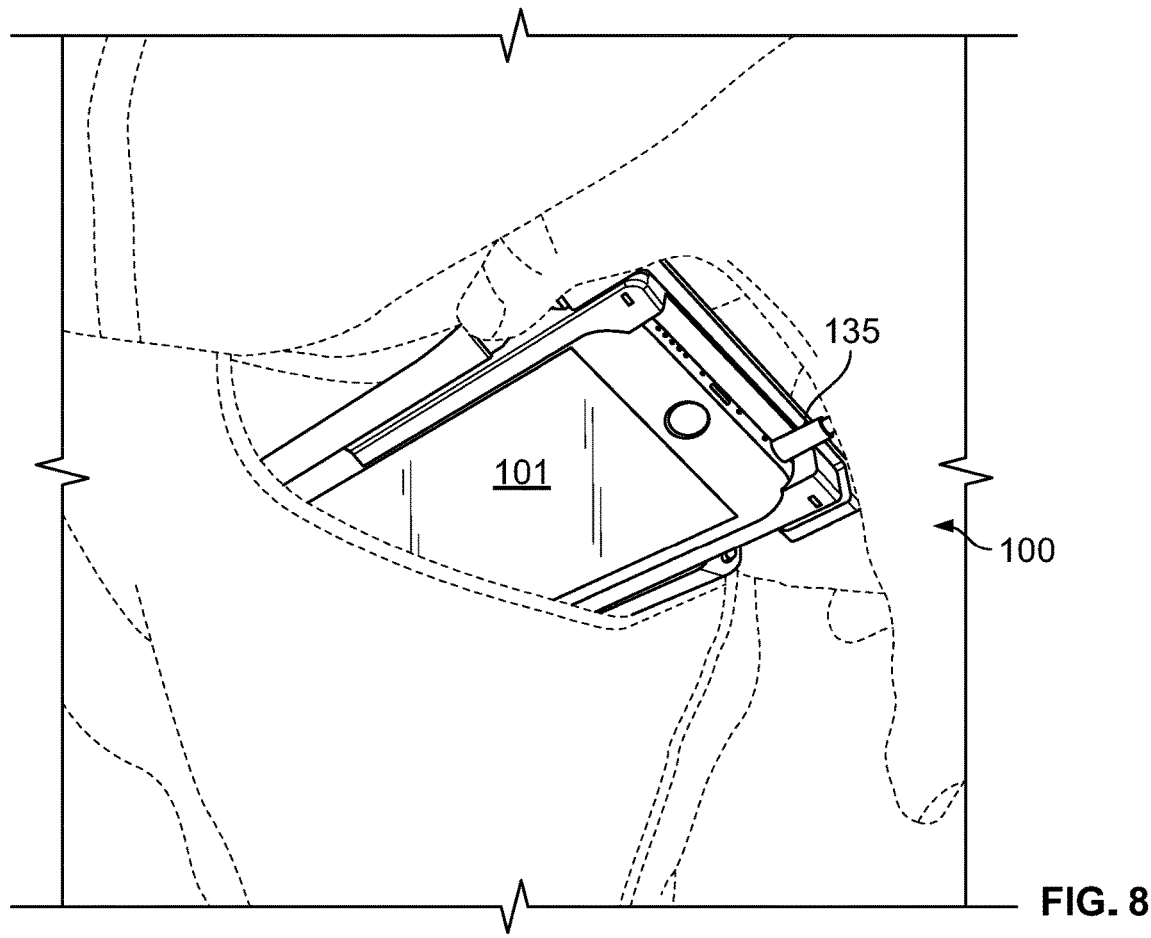
FIG. 8 illustrates one embodiment of a case being removed from a pants pocket.

FIG. 8 shows one embodiment of the case in the first configuration being removed from a pocket.

In a preferred embodiment, the corners of the case are rounded and the sides of the exposed portions of the outer member 103 and the inner member 102 are flat or gradually slanted so as to avoid catching on clothing when case is inserted or removed from a pocket, for example.

The inner member can slide into the open end of the outer member 103 either top first (like the configuration illustrated in FIG. 7) or bottom first like shown in FIG. 8. In this configuration, the top portion, not the bottom portion, of the inner member butts up against the bumper 122.

In some embodiments, in this reversed orientation, the camera opening 108 of the inner member 102 is not aligned with the camera opening 108 of the outer member 103. In some embodiments camera openings can be positioned to be aligned in either or both configurations.

In the illustrated embodiment, the portable device is playing music within the pocket. In this arrangement, the headphones are connected via an audio cable 135 to an audio port at the bottom of the portable device 101.

The gaps between the hinge stops 117 on lateral sides of the outer member 103 provide for a convenient place to position fingers to grip the case and pull it out of the pocket or push it into the pocket. The fingers may also grip the case at these gaps when holding it up against one's ear during a phone conversation, or when holding it in one hand while typing a text message with the other hand. This grip point may be particularly helpful in snowy or rainy conditions when the case may become more wet and slippery.

In alternative embodiments, a portion of the outer member 103 may be widened to allow for a better grip on the case 100.

Figure 9:
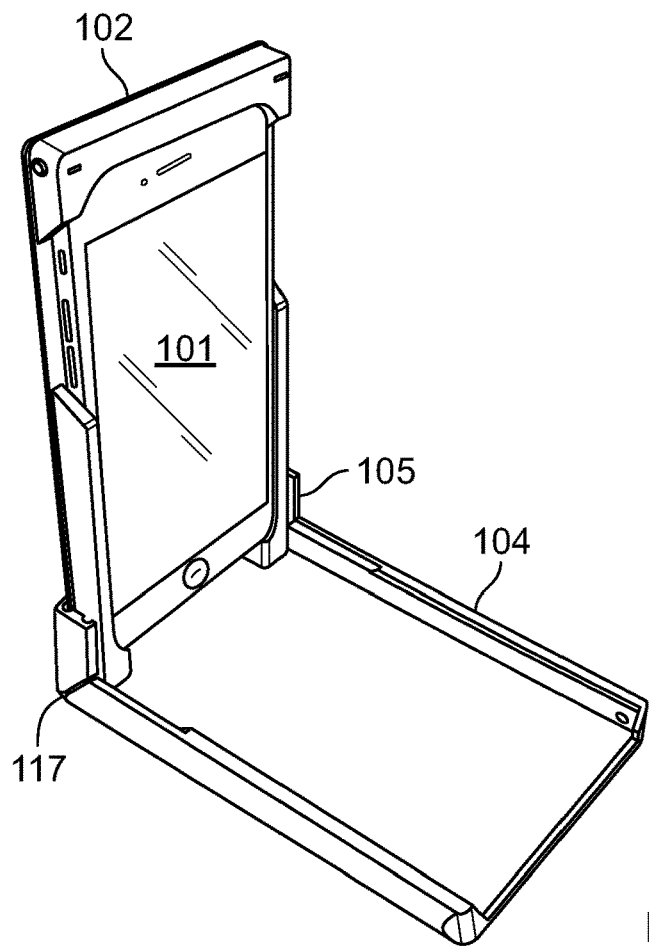
FIG. 9 illustrates one embodiment of the case configured as a portrait stand.

FIG. 9 shows an embodiment of the case configured as a stand.

The extension member 105 is oriented at a substantially right angle to the base member 104. The inner member 102 is inserted into the track 115 within the extension member 105 until the bottom of the inner member 102 rests on the base member 104. Since the portable device is retained within the cavity at a raised position from the base member 104 and there is a gap in the periphery of the inner member 102 at the bottom of the portable device 101, any speakers and microphones positioned on the bottom of the portable device 101 are not obstructed.

The angular position is determined by the hinge stops 117. These hinge stops 117 butt up against each other when the extension member 105 has a particular angular position relative to the base member 104. The hinge magnets 116 are oriented such that they are attracted to the corresponding hinge magnet 116 in the opposing hinge stop 117.

It is contemplated that the substantially right angle can be between 80 and 90 degrees. In a preferred embodiment, the extension member 105 has an angular position of about 85 degrees relative to the base member 104.

The slightly forward bias of the extension member 105 and the phone contained within the inner member 102 when in this configuration, allows gravity to work in support of the hinge magnets 116 in remaining butted up against each other and maintaining the angular position.

As the angular position approaches 90 degrees, physical disturbances are more likely to cause the weight of the mobile phone cross over above 90 degrees thereby having gravity work against the magnets and cause the hinge to open up.

When positioned on a raised surface such as on top of a computer tower, on top of a desk, shelf or stack of books such that the portable device 101 would be approximately at the elevation of their ones eyes, this orientation may be used for a hands-free video chat though the portable device 101.

Figure 10:
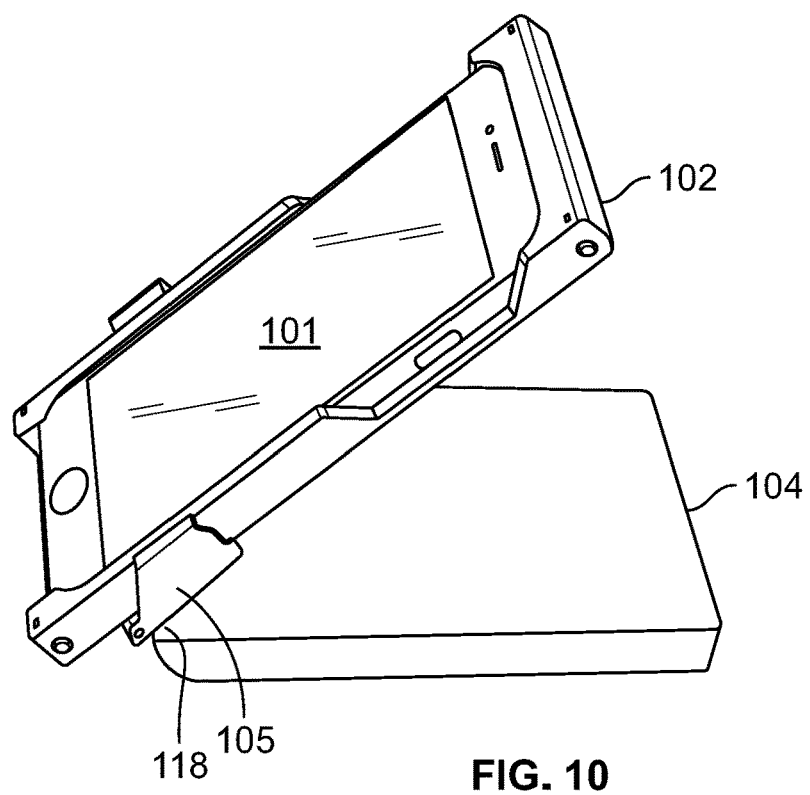
FIG. 10 illustrates one embodiment of the case configured as a portrait stand.

FIG. 10 shows an embodiment of the apparatus configured to act as a stand.

The base member 104 is face down on the surface and the extension member is bent backwards at an angular position of more than 270 degrees relative to the inner cavity of the base member 104. In a preferred embodiment, the angular position is about 300 degrees. In other embodiments, the angular position is between 280 and 320 degrees in this configuration.

This angular position is set by the second hinge stop. The second hinge stop butt up against the back of the extension member when the extension member 105 has a particular angular position relative to the base member 104.

The inner member 102 slides through the track of the extension member 105 until the base of the inner member rests on the support surface.

The weight of the extension member 105 and the portable device 101 contained within the inner member 102 allows gravity to maintain the extension member 105 and the hinge stop 118 butted up against each other and maintaining the angular position defined by the hinge stop 118.

Figure 11:
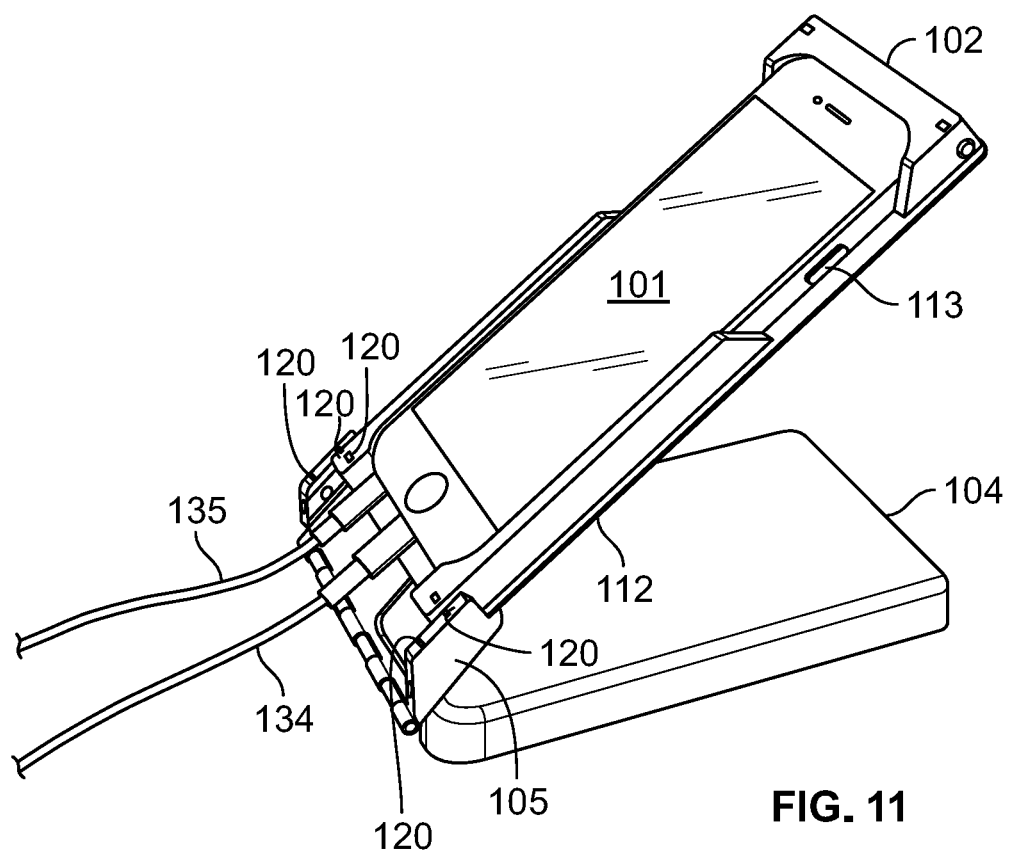
FIG. 11 illustrates one embodiment of the case configured as a portrait stand.

FIG. 11 shows an embodiment of the case configured as a stand.

The base member 104 is face down on the surface and the extension member is bent backwards at an angular position of more than 270 degrees relative to the inner cavity of the base member 104. In a preferred embodiment, the angular position is about 300 degrees. In other embodiments, the angular position is between 280 and 320 degrees in this configuration.

This angular position is set by the hinge stop 118. The hinge stop 118 butts up against the back of the extension member 105 when the extension member 105 has a particular angular position relative to the base member 104.

The inner member 102 slides through the track of the extension member 105 but remains raised above the support surface.

The weight of the extension member 105 and the portable device 101 contained within the inner member 102 allows gravity to maintain the extension member 105 and the hinge stop 118 butted up against each other and maintaining the angular position.

The weight of the extension member 105 and the portable device 101 contained within the inner member 102 hangs over the edge of the extension member 105. The edge of the extension member 105 acts as a pivot point thereby causing the bottom of the inner member 102 to be pressed up against the track 115 within the extension member 105. This force increases friction and tends to hold the portable device in the raised position.

In this position, the case magnets 110 at the bottom of the inner member 102 are aligned with the case magnets 110 that are position second from the bottom edge of the outer member 103. The attraction between these adjacent case magnets 110 tends to hold the portable device in the raised position above the bottom edge of the outer member 103. The user can easily see that the magnets are aligned by lining up the magnet indicator 120 of the inner member 102 with the magnet indicator 120 of the outer member 103.

The raised position allows the ports 114 at the bottom of the portable device 101 to be more accessible to power cables 134 and audio cables 135, for example. The portable device 101 is positioned for use while continuing to be charged. Thus, the user does not have to choose between charging and using the phone. This may reduce the likelihood of a dead battery when leaving the office for some use cases.

The raised position allows the ports 114 at the bottom of the portable device 101 to be less accessible to contaminants from the surrounding environment that might get into the ports 114. For example, when positioned on a kitchen countertop, there may be contaminants such as sugar, salt and flour that might get into ports 114 for data and power, speakers or other openings near the bottom of the portable device 101.

Figure 12:
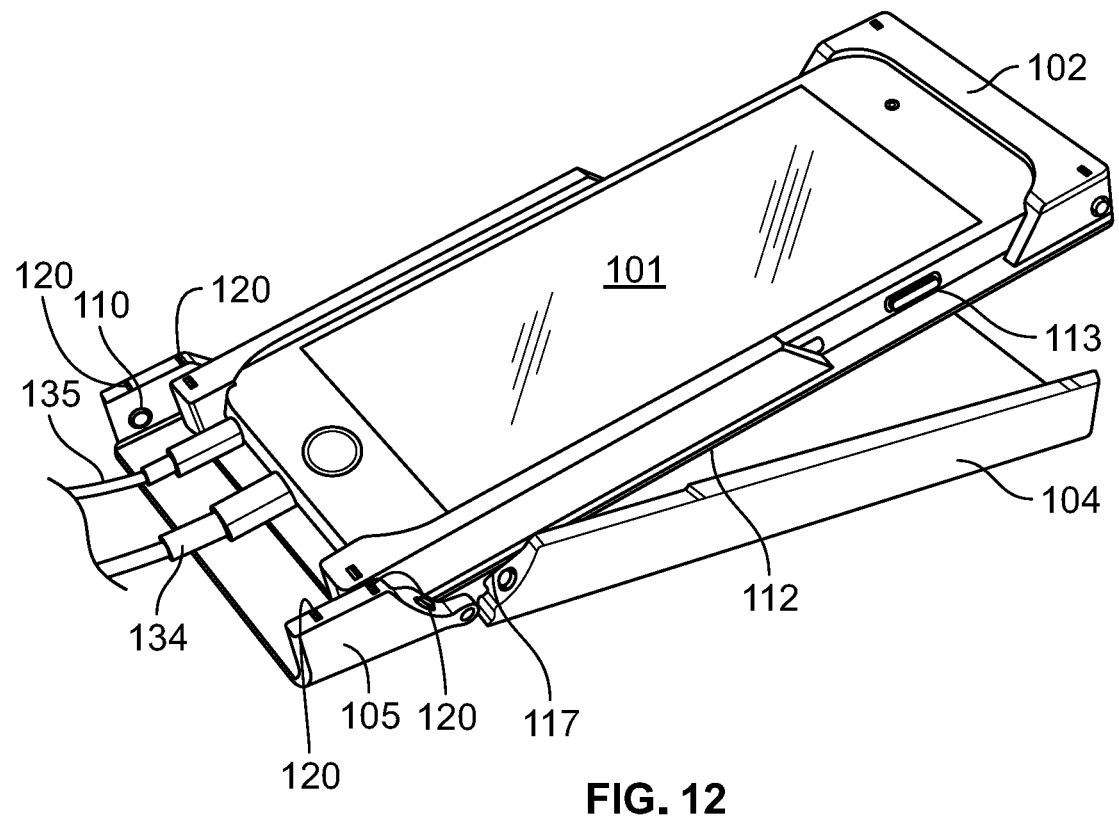
FIG. 12 illustrates one embodiment of the case configured as a portrait stand.

FIG. 12 shows an embodiment of the case configured as a stand.

The outer member 103 is laid with the cavity face up. The inner member 102 is inserted into the track 115 from the hinge side of the extension member 105.

In this position, the case magnets 110 at the bottom of the inner member 102 are aligned with the case magnets 110 that are positioned second from the bottom edge of the outer member 103. The attraction between these adjacent case magnets 110 tends to hold the portable device in the position above the bottom edge of the outer member 103.

The ledges 139 (not shown) act as a hinge stop in this configuration.

The base member 104 is face up on the surface and the ledges 139 catch the rails 112 of the inner member 102. In a preferred embodiment, the angular position is about 330 degrees. In other embodiments, the angular position is between 325 and 335 degrees in this configuration.

Figure 13:
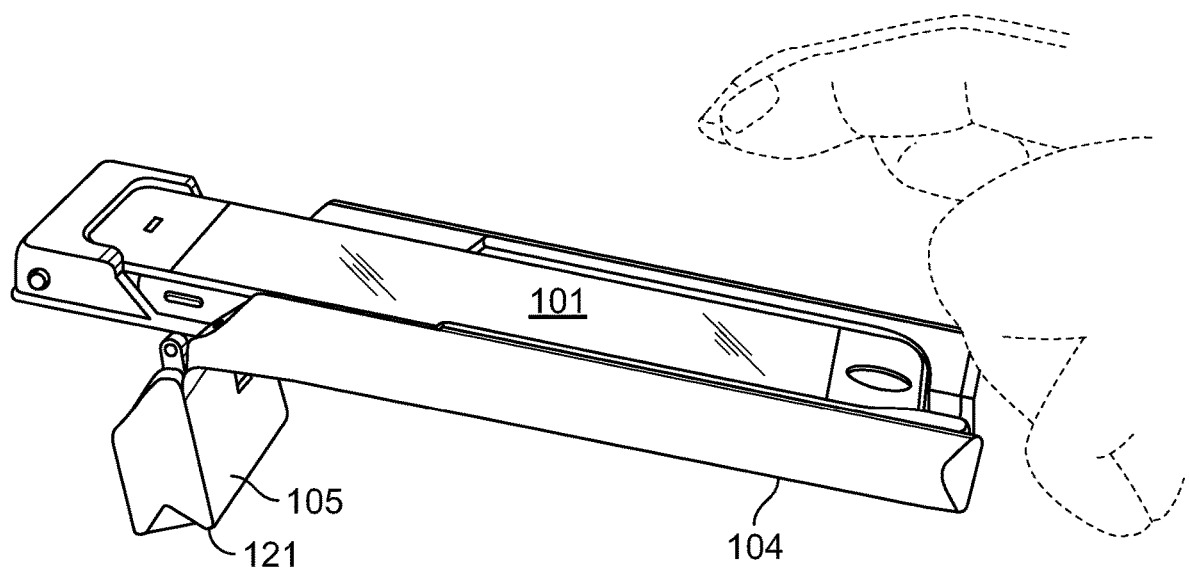
FIG. 13 illustrates one embodiment of the case configured as a portrait stand.

FIG. 13 shows an embodiment of the case configured to act as a stand.

The extension member 105 is bent backwards and is used as a support to raise one end of the base member 104 off of the support surface. The rail guide 121 causes the extension member 105 to lean in one direction.

With the extension member 105 out of the way, the inner member 102 can directly into the base member 104 until the inner member 102 reaches the bumper 122. This position allows data or power cables to run underneath the device on a crowded desk, if working next to the phone.

Figure 14:
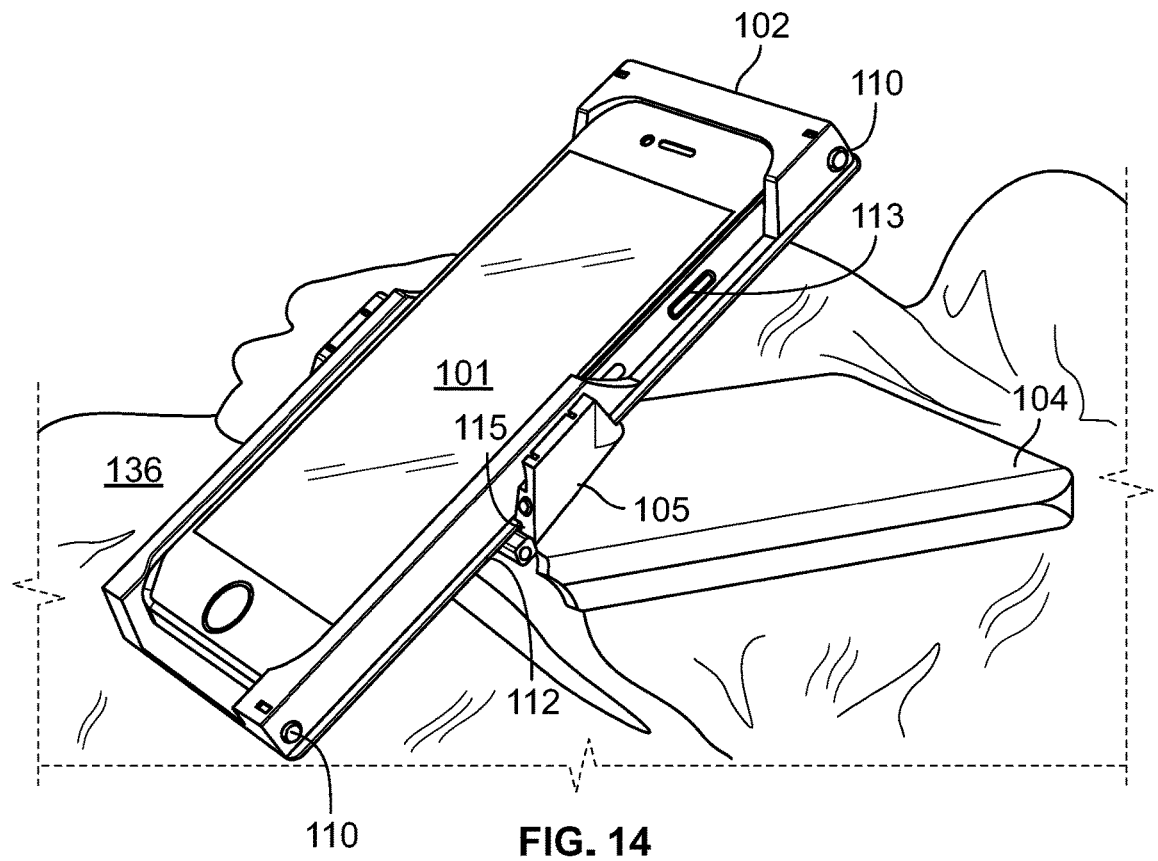
FIG. 14 illustrates one embodiment of the case configured as a portrait stand.

FIG. 14 shows an embodiment of the case configured as a stand.

The base member 104 is face down on the surface and the extension member is bent backwards at an angular position of more than 270 degrees relative to the inner cavity of the base member 104. In a preferred embodiment, the angular position is about 300 degrees. In other embodiments, the angular position is between 280 and 320 degrees in this configuration.

In the illustrated embodiment, the blanket 136 has an uneven surface where the portion in contact with the inner member 102 is lower than the portion underneath the base member 104. One can see that it slides further through the extension member 105 than it does as shown in FIG. 10.

The inner member 102 slides through the track of the extension member 105 until the base of the inner member rests on the support surface. Compare this to FIG. 10 which shows a configuration that might be expected when the case is positioned on a flat surface such as a desk or table.

The weight of the extension member 105 and the phone contained within the inner member 102 allows gravity to maintain the extension member 105 and the hinge stop 118 in butted up against each other and maintaining the angular position. The "U" shaped structure of base member 104, when in this position can also be stably placed on knees or thighs when seated in the backseat of a car, where the knee is slightly elevated from the thigh. The shelf 139 on base member 104 serves as stabilizers for the contours of the leg or knee. It may also be used on the contoured armrests of many couches and loveseats.

Figure 15:
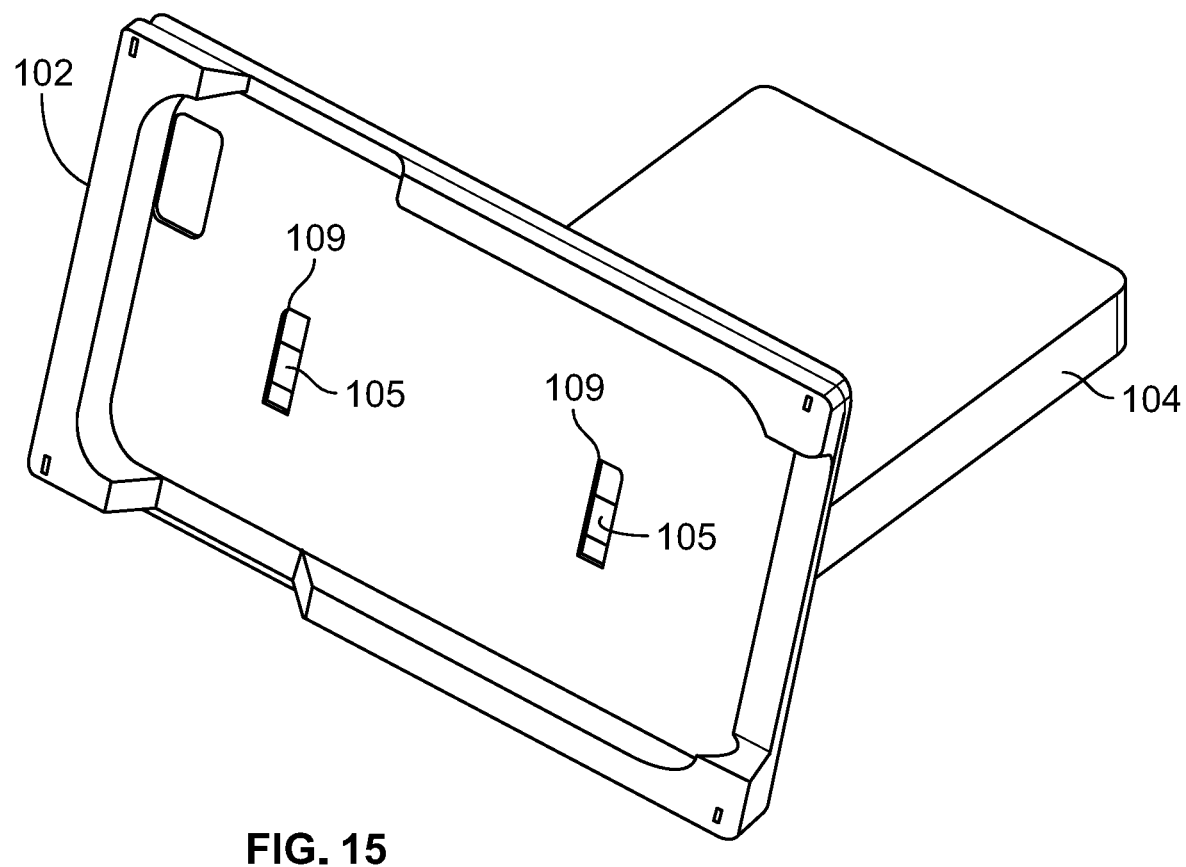
FIG. 15 illustrates one embodiment of the case configured as a landscape stand.

FIG. 15 shows an embodiment of the case configured as a landscape stand.

The base member 104 is face down on a support surface (not shown) and the extension member 105 is bent backwards.

Base connectors 109 are openings in the inner member 102 positioned to receive the protrusions from the hinge. When extension member 105's outer tabs are inserted in the holes, the back of portable device 101 stops the extension member 105. The tips of the extension member 105 then catch the base connectors 109 when inserted into the base connectors 109. Because extension member 105 is flexed back, it a stabilizing "lean" angle is created for viewing and/or manipulating the screen. The angular position of the hinge can be adjusted to cause the angle of the inner member 102 to be more vertical or slanted as desired within a predetermined range.

Figure 16:
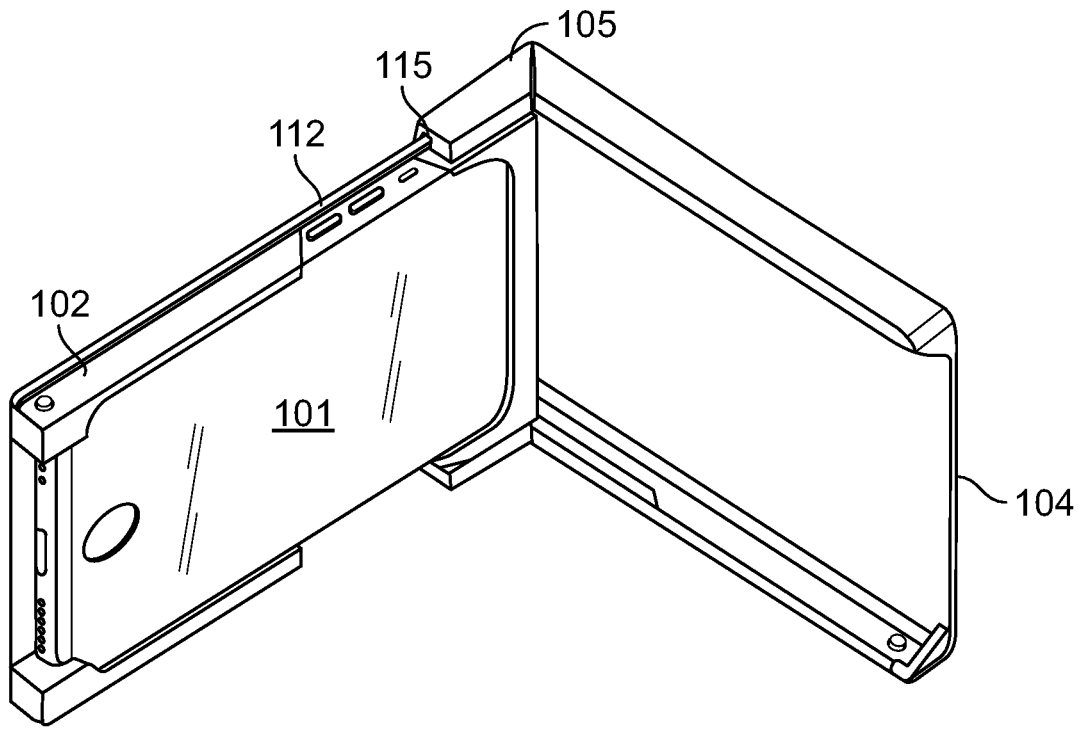
FIG. 16 illustrates one embodiment of the case configured as a landscape stand.

FIG. 16 shows an embodiment of the case configured as a landscape stand.

The base member 104 is inserted into the outside edge of the extension member 105, and the hinge is bent at a substantially right angle relative to the base member 104.

Figure 17:
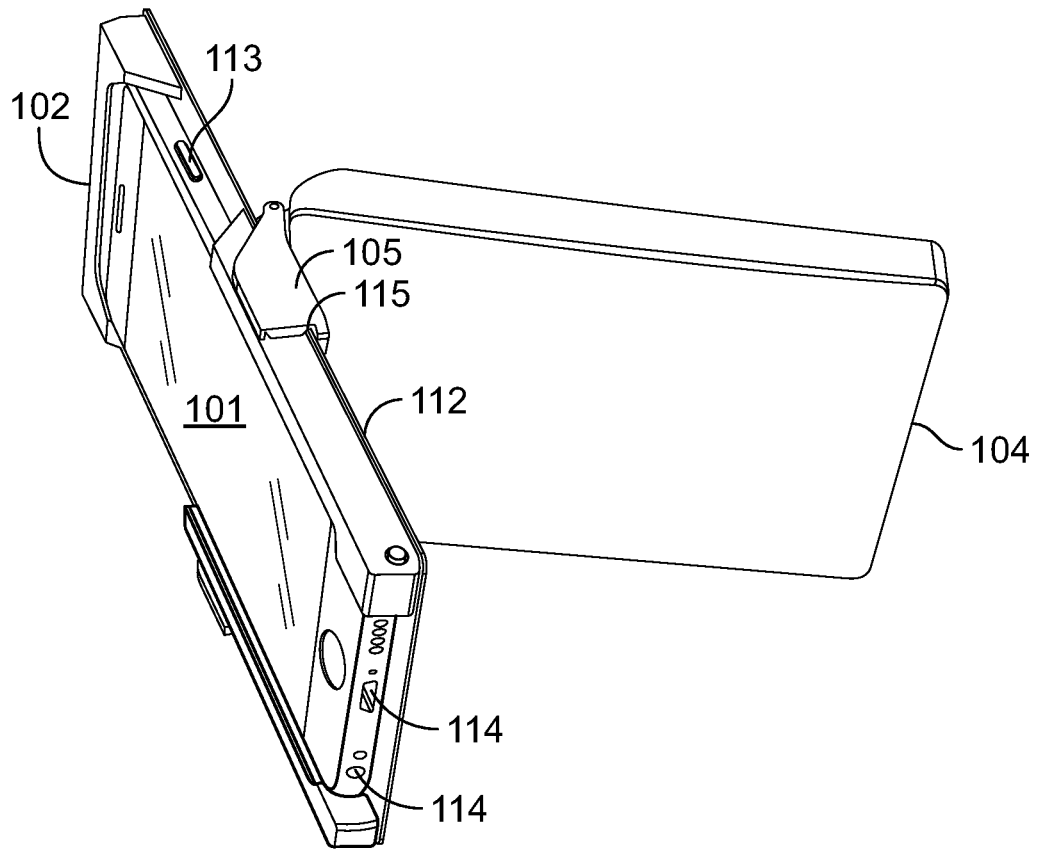
FIG. 17 illustrates one embodiment of the case configured as a landscape stand.

FIG. 17 shows an embodiment of the case configured as a landscape stand.

The extension member 105 is bent backwards and the inner member 102 is inserted into the hinge end of the extension member 105.

The extension member 105 is positioned near the middle of the inner member 102, in the illustration shown in FIG. 17, but it can be positioned at other points as the extension member 105 slides along the rails 112.

The base member 104 extends outward from the inner member to support the vertical landscape position of the inner member 102. The base member 104 extends back from the inner member 102 in the illustration shown in FIG. 17, but angular position can be adjusted to that the base member 104 extends back in other directions.

One can slide the base member 104 to the end of the inner member 102 and bend the hinge forward so that the the base member 104 up to the first hinge stop 117 as shown in FIG. 16. One can bend the hinge backward so that the the base member 104 runs up against the hinge stop 118.

When the base member is oriented to the right of the display.

Figure 18:
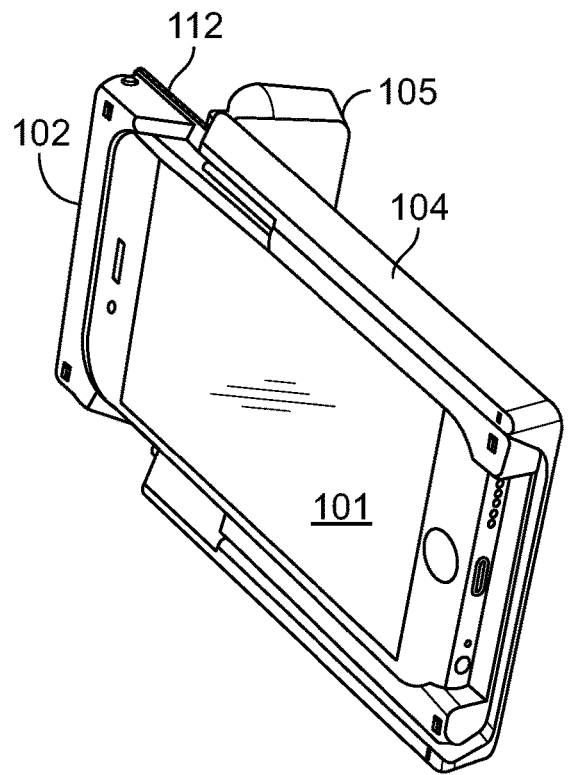
FIG. 18 illustrates one embodiment of the case configured as a landscape stand.

FIG. 18 shows an embodiment of the case configured as a landscape stand.

The extension member 105 is bent backwards and the inner member 102 is inserted directly into the base member 104.

The extension member 105 extends back from the inner member to support the vertical landscape position of the inner member 102. The extension member 105 extends back from the inner member 102 in the illustration shown in FIG. 18, but angular position can be adjusted to that the base member 104 extends back in other directions.

Figure 19:
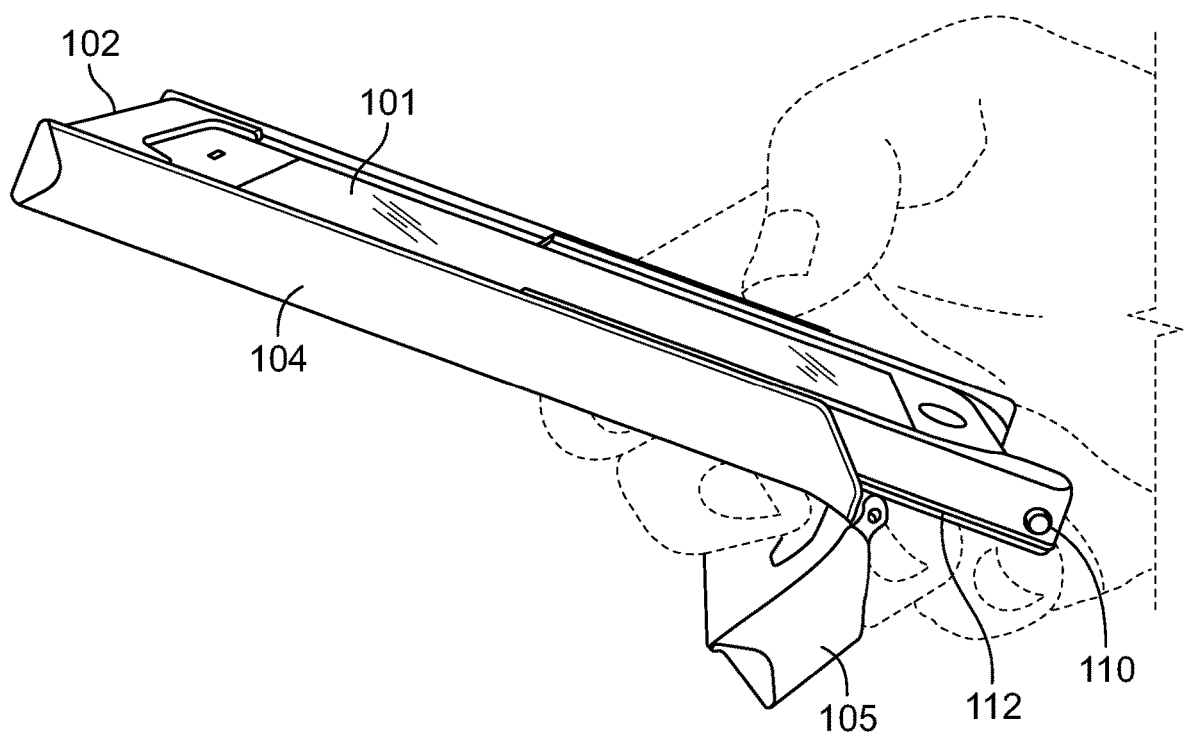
FIG. 19 illustrates one embodiment of the case configured with a grip.

FIG. 19 shows an embodiment of the case configured with a handle.

The extension member 105 is bent backwards and the inner member 102 is inserted directly into the base member 104.

The extension member 105 extends back from the inner member to act as a handle that can be positioned between fingers when the case is held in a hand. The extension may allow someone to more securely hold the portable device.

Figure 20:
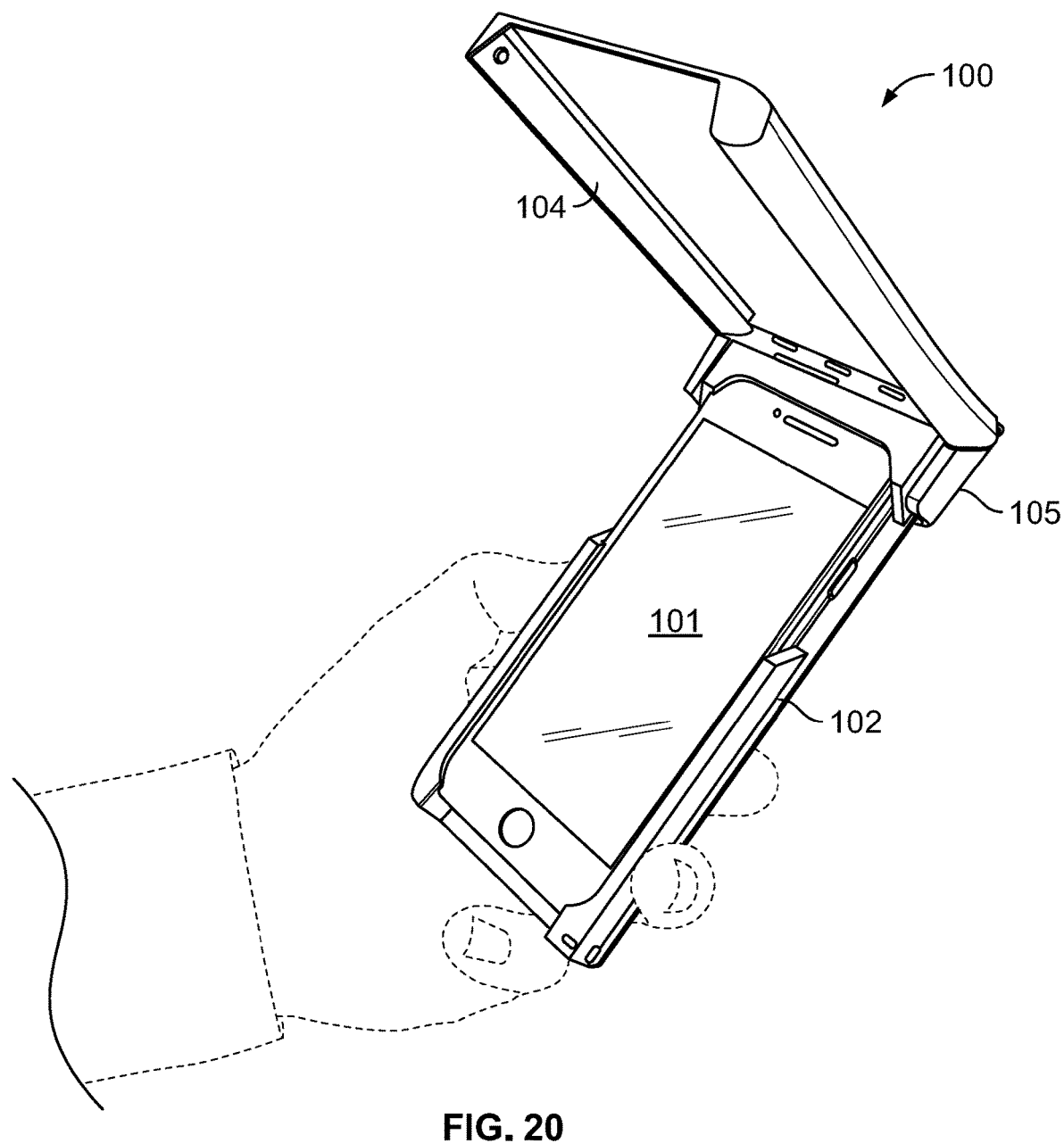
FIG. 20 illustrates one embodiment of the case configured as a screen shield.

FIG. 20 shows an embodiment of the case configured with a display shield.

The extension member 105 is oriented at a substantially right angle to the base member 104. The top of the inner member 102 is inserted into the extension member 105.

The base member 104 overhangs the display of the portable device 101.

The display shield may be used to block sunlight so that the display can be better viewed. It may allow for the screen intensity to be turned down thereby saving power and extending battery life.

Figure 21:
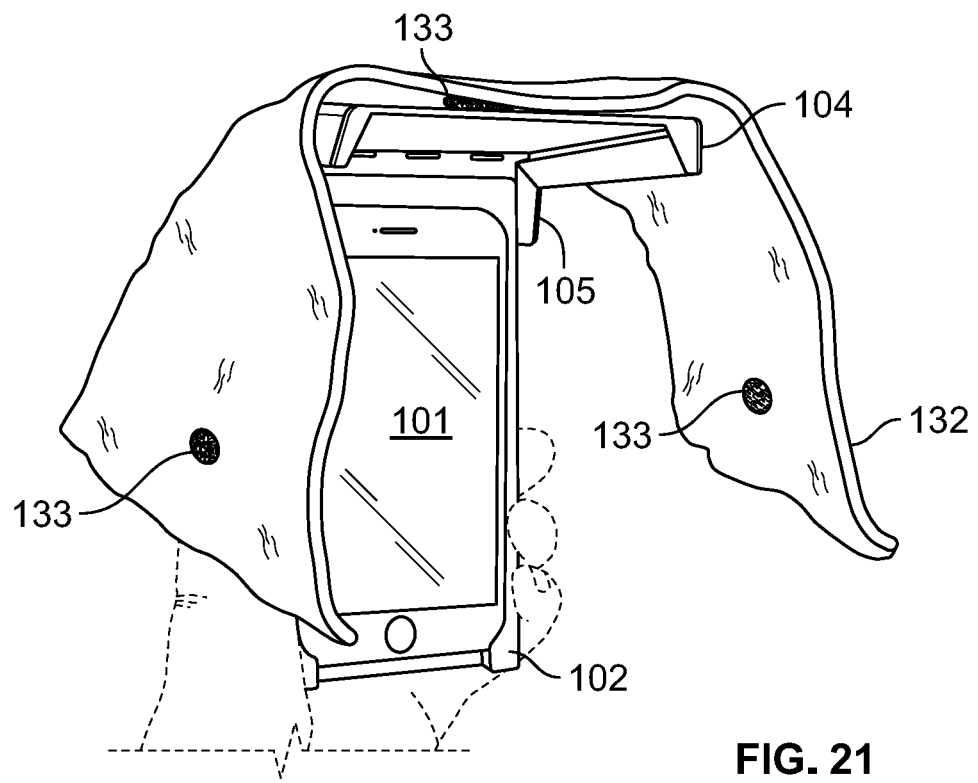
FIG. 21 illustrates one embodiment of the case configured as a screen shield with draped cloth.

FIG. 21 shows an embodiment of the case configured with a display shield.

The extension member 105 is oriented at a substantially right angle to the base member 104. The top of the inner member 102 is inserted into the extension member 105.

The base member 104 overhangs the display of the portable device 101.

A towel 132 is used to drape over the display shield to provide shielding from, for example, ambient sunlight, or protection from unwanted viewing of the display by nearby persons.

In some embodiments the towel 132 and the base member 104 has hook and loop tape 133 attached to securely attach the towel 132 to the base member 104 so that it will remain attach even as the phone is moved around.

The display shield may be used to block sunlight so that the display can be better viewed. It may allow for the screen intensity to be turned down thereby saving power and extending battery life.

Figure 22:
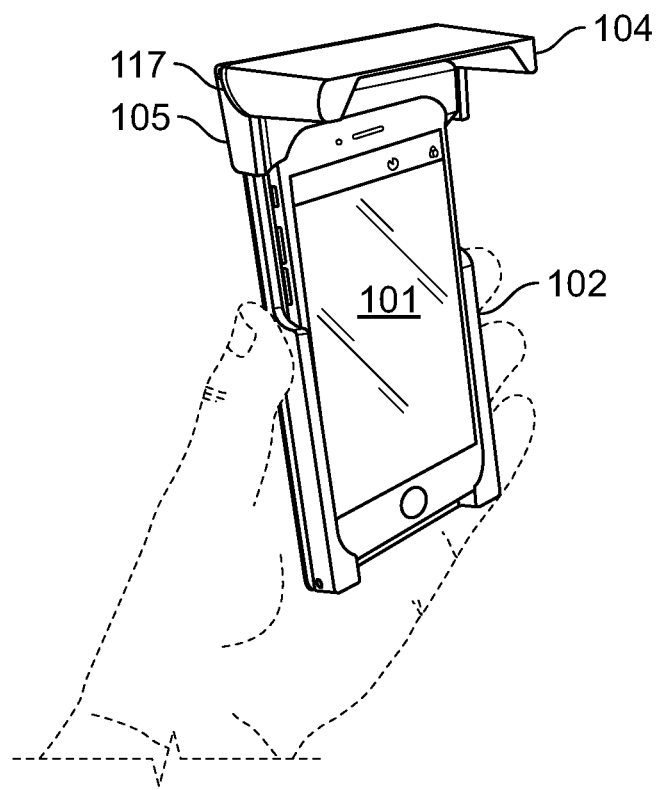
FIG. 22 illustrates one embodiment of the case having a short base member.

FIG. 22 shows an embodiment of the case configured with a display shield.

The extension member 105 is oriented at a substantially right angle to the base member 104. The top of the inner member 102 is inserted into the extension member 105.

The base member 104 overhangs the display of the portable device 101. In this illustrated example, the base member 104 is short as compared to the base member in FIG. 20, for example.

In some embodiments, the base member 104 comprises a detachably engageable portion such that the base member 104 without the detachably engaged portion is about one-fifth the length of the base member 104 with the detachably engagable portion attached.

In other embodiments, the user switches between an outer member 103 with a base member 104 that is short and outer member 103 with a base member 104 that is long. The short and long lengths can be a matter of design choice.

Figure 23:
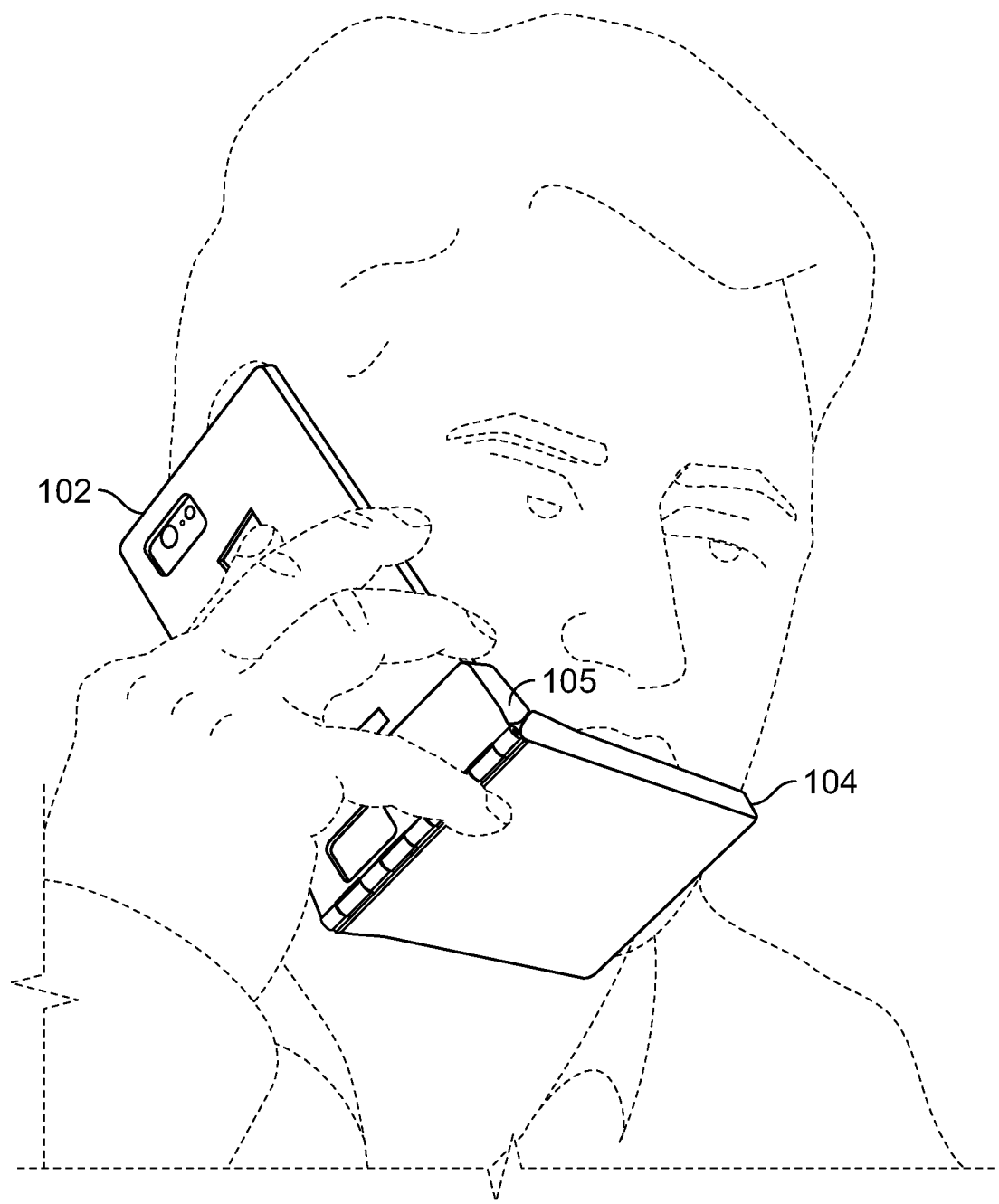
FIG. 23 illustrates one embodiment of the case configured as a voice privacy shield.

FIG. 23 shows an embodiment of the case configured with a voice shield.

The extension member 105 is oriented at a substantially right angle to the base member 104. The bottom of the inner member 102 is inserted into the extension member 105.

The base member 104 covers a user's mouth as they talk into a microphone on the portable device 101.

Figure 24:
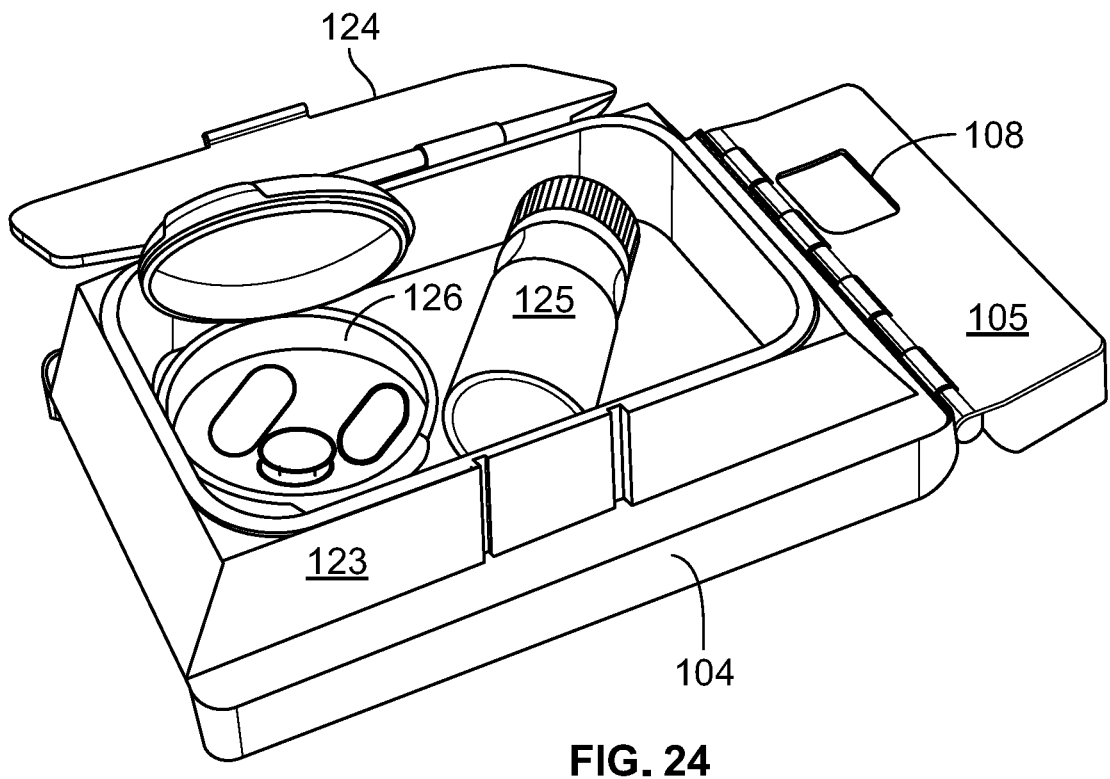
FIG. 24 illustrates one embodiment of an outer member with an integrated container, the inner cavity being face down in the illustration.

FIG. 24 shows an embodiment of the case configured with container.

The container 123 is integrated on the back of the base member 104.

In a preferred embodiment, the corners of the box are rounded and the sides of the exposed portions of the outer member 103 and the inner member 102 are flat or gradually slanted so as to avoid catching on clothing when case is inserted or removed from a pocket, for example.

The size and shape of the container is a matter of design choice. In some embodiments, the container has a lower profile which tends to make it less burdensome to carry and less difficult to insert into and remove from pockets. In other embodiments, the container has a higher profile to allow for more to be contained within.

One anticipated application for the box is to carry medication. Since a mobile phone tends to always be nearby the apparatus is a convenient location to store daily medication. Software applications on the portable device might generate alarms and other notifications to remind someone to take the medication at the appropriate times.

Patients non-adherence to a medication schedule is a serious issue. Many people keep their mobile phone on their person or nearby at all times. Applications on the phone can issue reminder notifications to take their medication. By storing the medication in a container on a mobile phone case, one is more likely to have the medication with them as necessary.

The size of anticipated items may drive the choice of box size. For example, standard pharmaceutical containers may be considered.

Figure 25:
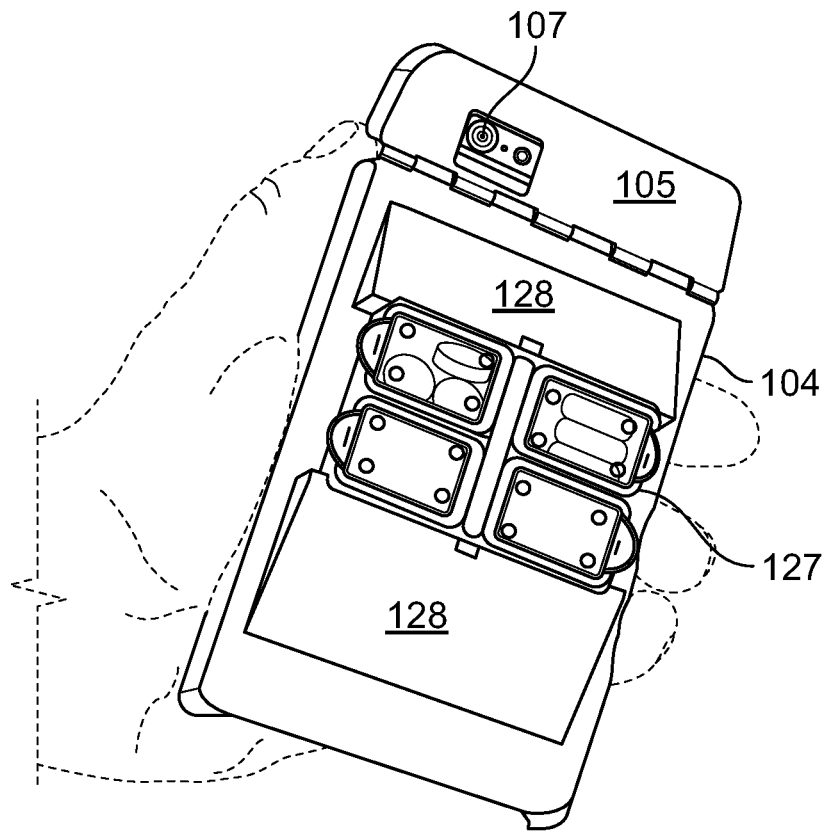
FIG. 25 illustrates one embodiment of an outer member with an integrated receptacle for a 4-dose container, the inner cavity being face down in the illustration.

FIG. 25 shows an embodiment of the outer member 103 with a receptacle for a standard daily four-dose prescription medication pill box.

In a preferred embodiment, the corners of the receptacle are rounded and the sides of the exposed portions of the outer member 103 and the inner member 102 are flat or gradually slanted so as to avoid catching on clothing when case is inserted or removed from a pocket, for example.

Figure 26:
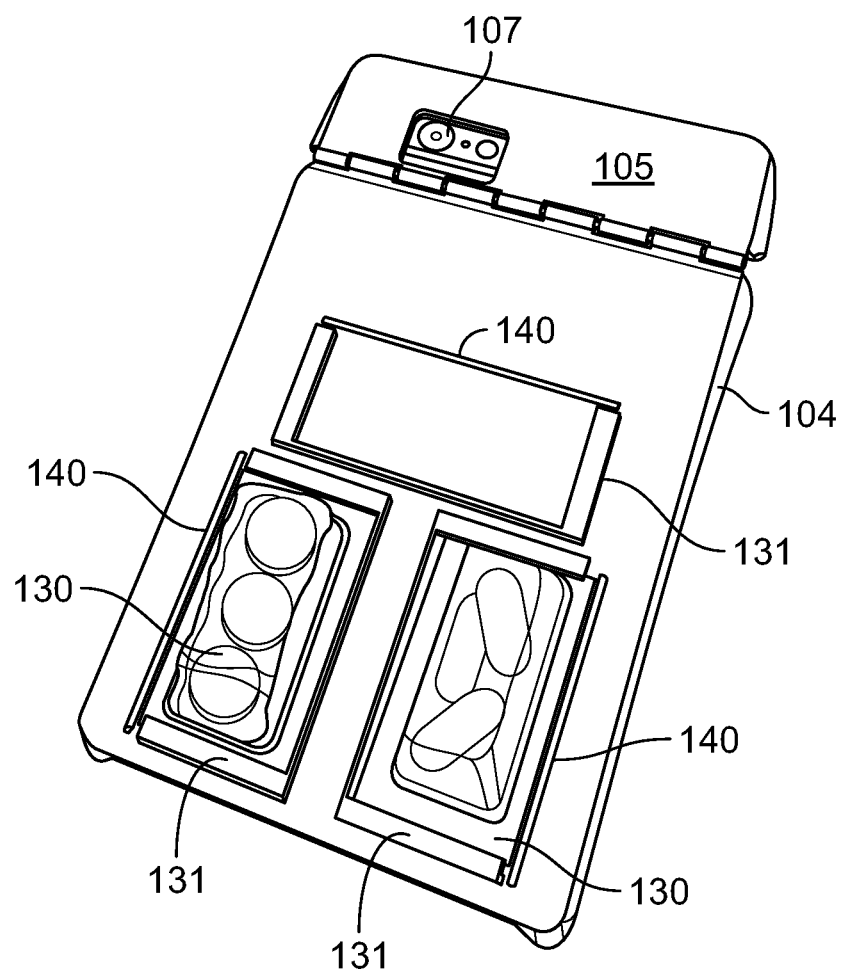
FIG. 26 illustrates one embodiment of an outer member with an integrated receptacles for blister packs, the inner cavity being face down in the illustration.
Figure 6:
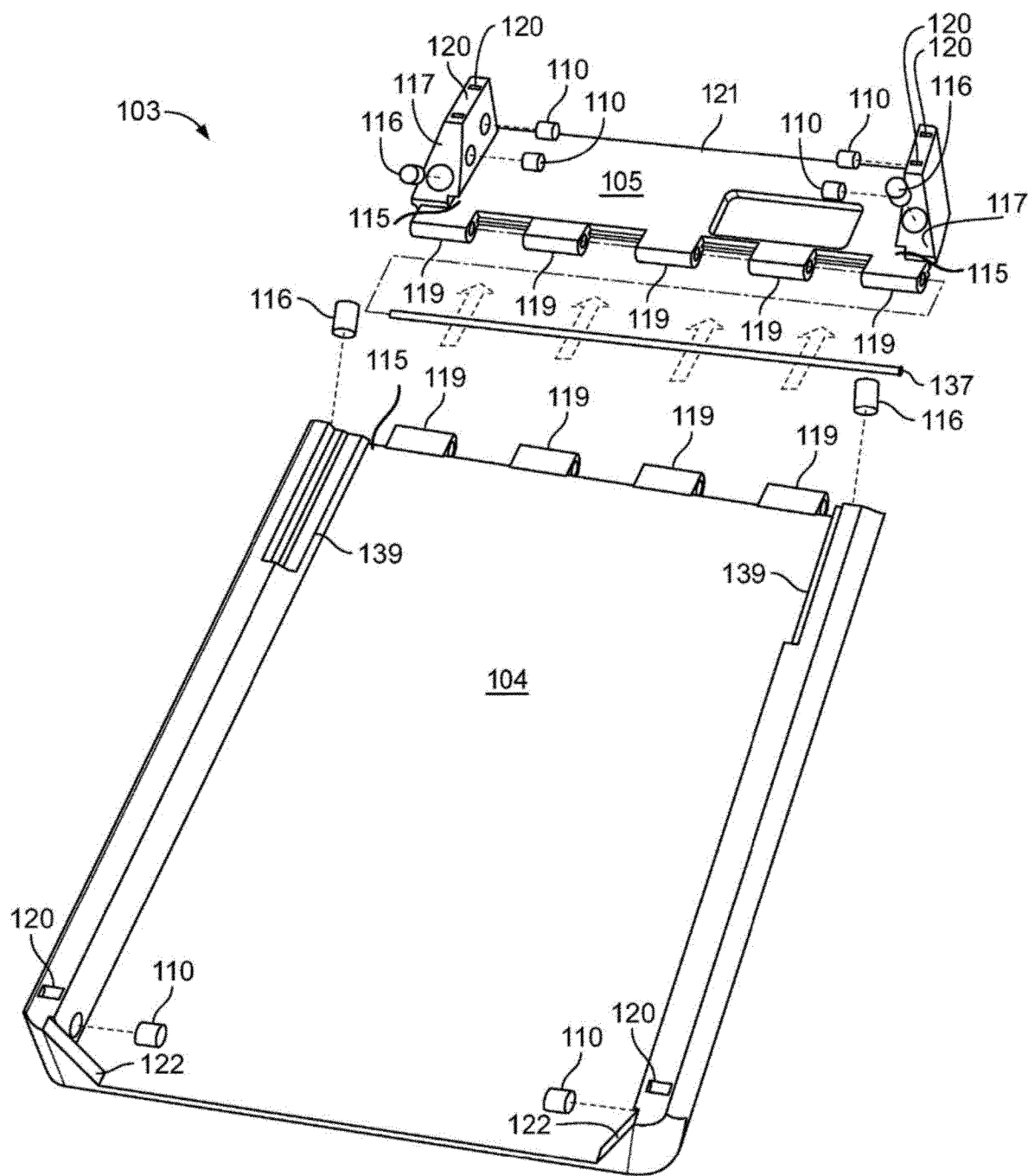

FIG. 26 illustrates one embodiment of an outer member 103 having three blister pack receptacles on the backside of the case. Blister packs are one way to distribute pre-sorted daily medications. In one embodiment, the receptacles are labeled "breakfast," "lunch" and "dinner" to associate each blister pack with a medication schedule.

The blister packs have a cardboard base of a standard dimension. The lips of the receptacle receive the cardboard member and a retaining bump secures it from falling out.

The phone can be inserted into and removed from a pocket with the blister packs.

The cases described herein are purely exemplary and it will be apparent to those skilled in the art that variations are contemplated.

The magnets used herein may be made of any number of well-known magnetic materials.

The use of case magnets for positioning the inner member may be substituted with other mechanisms of locking the phone in position. For example, one might have a mechanism for removably inserting a locking pin between the inner member 102 and the outer member 103 to lock them in position.

When the locking pin is removed, the inner member 102 would slide within the outer case as described herein.

The hinge can be substituted with other methods changing the angular relationship between the extension member 105 and the base member 104 between at least two positions. In some embodiments the hinge may be a flexible material such as plastic, rubber or silicon, connecting the extension member 105 and the base member 104 to provide at least two positions by deforming. This angular motion may be alternative described as pivoting or pivotal motion The illustrated embodiments show a rail and track for supporting the sliding of the inner member 102 within the outer member 103. In other embodiments, more rails and tracks are used on either side of the inner member 102. In other embodiments, ball bearings or other means may be used to improve slideability. In yet other embodiments, the path of the motion may deviate from a linear path.

A number of variations may be made in the disclosed embodiments, all without departing from the scope of the invention, which is defined solely by the appended claims.

What is claimed is:

1. A case for a portable device, the case comprising:
an inner member defining a device receiving cavity that removably receives the portable device;
a base member;
an extension member pivotally coupled to the base member so that the extension member is pivotable relative to the base member between at least a first position and a second position, wherein the extension member is substantially parallel with the base member in the first position, wherein, in the first position, the inner member is fits within both the base member and the extension member, and, in the second position, the inner member is positionable within one of the base member and the extension member.

2. The case of claim 1 wherein the portable device is one of a mobile phone or tablet computer.

3. The case of claim 1 wherein the extension member is pivotally coupled to the base member using a hinge.

4. The case of claim 3 wherein the hinge has a hinge stop that restricts the extension member from pivoting beyond the second position.

5. The case of claim 4 wherein the hinge stop comprises a pair of magnets.

6. The case of claim 4 wherein the hinge stop comprises at least one pair of magnets positioned to magnetically attract when the extension member is in the second position.

7. The case of claim 3 wherein the hinge has a hinge stop that restricts the extension member from pivoting beyond a third position.

8. The case of claim 7 wherein the extension member is positioned between 300 and 330 degrees relative to the base member in the third position.

9. The case of claim 3 wherein the inner member is receivable into the base member via an opening adjacent to the hinge.

10. The case of claim 3 wherein the inner member is receivable into the extension member via an opening adjacent to the hinge.

11. The case of claim 3 wherein the inner member is receivable into both the base member and the extension member in the first position via an opening.

12. The case of claim 1 wherein extension member is positioned between 80 to 90 degrees relative to the base member in the second position.

13. The case of claim 1 wherein the inner member comprises a first plurality of magnets, the inner member is receivable into the base member and the extension member in the first position by sliding the inner member into an opening along a path within the base member and the extension member, the case comprises a second plurality of magnets along the path positioned to magnetically couple with the first plurality of magnets as the inner member slides along the path.

14. The case of claim 1 wherein the base member comprises a container.

15. The case of claim 1 wherein the base member comprises a receptacle for a blister pack.

16. The case of claim 1 wherein the base member comprises a receptacle for a 4-dose pill box.

17. The case of claim 1 wherein the inner member is fit within both the base member and extension member in the first position by sliding the inner member along a path defined collectively by the base member and the extension member.

* * * * *

UNITED STATES PATENT AND TRADEMARK OFFICE
CERTIFICATE OF CORRECTION

| | |
|---|---|
| PATENT NO. | : 10,728,752 B2 |
| APPLICATION NO. | : 15/953401 |
| DATED | : July 28, 2020 |
| INVENTOR(S) | : John David Lee |

It is certified that error appears in the above-identified patent and that said Letters Patent is hereby corrected as shown below:

In the Drawings

Please replace FIG. 6 with FIG. 6 as shown on the attached page

In the Specification

In Column 3, Line 13 – "When the base member and the 104 and the outer member" should read -- When the base member 104 and the outer member --

In Column 3, Line 32 – "has an camera" should read -- has a camera --

In Column 3, Line 66 – "when it is inserted" should read -- when they are inserted --

In Column 4, Line 22 – "In other embodiment" should read -- In other embodiments --

In Column 5, Line 27 – "A hinge stops 118 limit" should read -- A hinge stop 118 limits --

In Column 5, Line 32 – "associated with the hinge stops" should read -- associated with the hinge stop --

In Column 5, Line 48 – "substantially 90 degree angle" should read -- a substantially 90 degree angle --

In Column 6, Line 38 – "tracks 115 magnet" should read -- tracks 115, magnet --

In Column 6, Line 63 – "The inner member can slide" should read -- The inner member 102 can slide --

In Column 6, Line 65 – "in FIG. 7) or bottom first like shown in FIG. 8" should read -- in FIG. 8) or bottom first like shown in FIG. 7 --

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,728,752 B2

In Column 6, Lines 65-66 – "In this configuration" should read -- In this FIG. 8 configuration --

In Column 6, Line 67 – "inner member butts up against" should read -- inner member 102 butts up against --

In Column 8, Line 2 – "second hinge stop butt up" should read -- second hinge stop butts up against --

In Column 9, Line 52 – "in butted up against each other and maintaining the angular" should read -- butted up against each other, maintaining the angular --

In Column 9, Line 53 – "The "U" shaped structure" should read -- position. The "U"-shaped structure --

In Column 9, Line 54 – "when in this position can also be stably placed on knees or" should read -- when in this position, allows for it to be stably placed on knees or --

In Column 9, Line 56 – "The shelf 139" should read -- The ledge 139 --

In Column 10, Line 5 – "it a stabilizing "lean" angle" should read -- a stabilizing "lean" angle --

In Column 10, Line 28 – "but angular position can be adjusted to that the base member" should read -- but the angular position can be adjusted so that the base member --

In Column 10, Lines 35-36 – "When the base member is oriented to the right of the display." should be deleted In Column 10, Line 46 – "but angular position can be adjusted to that the base" should read -- but the angular position can be adjusted so that the base --

In Column 11, Line 15 – "attach even as the phone is moved around." should read -- attached even as the phone is moved around. --

In Column 12, Line 6 – "The size of anticipated items may drive the choice of box" should read -- The size of anticipated items (e.g. items 125 and 126) may drive the choice of box --

In Column 12, Line 11 – "medication pill box" should read -- medication pill box 127 --

In Column 12, Line 15 – "gradually slanted" should read -- gradually slanted 128 --

In Column 12, Line 16 – "case is inserted" should read -- the case is inserted --

In Column 12, Line 18 – "103 having three blister pack receptacles on the backside of" should read -- 103 having three blister pack receptacles 131 on the backside of --

In Column 12, Line 19 – "Blister packs" should read -- Blister packs 130 --

In Column 12, Line 25 – "a retaining bump" should read -- a retaining bump 140 --

In Column 12, Line 45 – "silicon" should read -- silicone --

In the Claims

In Claim 1, Column 13, Line 4 – "the inner member is fits" should read -- the inner member fits --